(12) United States Patent
Jakubowski

(10) Patent No.: US 8,924,592 B2
(45) Date of Patent: Dec. 30, 2014

(54) SYNCHRONIZATION OF SERVER-SIDE COOKIES WITH CLIENT-SIDE COOKIES

(75) Inventor: Robert Jakubowski, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 607 days.

(21) Appl. No.: 12/893,080

(22) Filed: Sep. 29, 2010

(65) Prior Publication Data

US 2011/0078333 A1   Mar. 31, 2011

Related U.S. Application Data

(60) Provisional application No. 61/246,710, filed on Sep. 29, 2009.

(51) Int. Cl.
*G06F 15/16* (2006.01)
*H04L 29/08* (2006.01)

(52) U.S. Cl.
CPC ........ *H04L 67/1095* (2013.01); *H04L 67/2814* (2013.01); *H04L 67/02* (2013.01); *H04L 67/2876* (2013.01)
USPC ........................................................ 709/248

(58) Field of Classification Search
CPC .. H04L 67/1095; H04L 67/2814; H04L 67/02
USPC .................. 709/248, 223, 225, 227, 228, 229
See application file for complete search history.

(56) References Cited

U.S. PATENT DOCUMENTS

| | | | |
|---|---|---|---|
| 6,976,077 B1 | 12/2005 | Lehew et al. | |
| 7,188,145 B2 * | 3/2007 | Lowery et al. | 709/214 |
| 7,660,831 B2 * | 2/2010 | Freedman | 707/621 |
| 7,788,316 B2 * | 8/2010 | Fok et al. | 709/203 |
| 7,792,790 B2 * | 9/2010 | Kim | 707/609 |
| 7,949,702 B2 * | 5/2011 | McGee et al. | 709/201 |
| 8,171,109 B2 * | 5/2012 | Schneider | 709/218 |
| 8,572,030 B2 * | 10/2013 | Clarke et al. | 707/610 |
| 2002/0107934 A1 * | 8/2002 | Lowery et al. | 709/213 |
| 2003/0041093 A1 | 2/2003 | Yamane et al. | |

(Continued)

FOREIGN PATENT DOCUMENTS

WO   WO-02/05487   1/2002

OTHER PUBLICATIONS

European Search Report on 10181961.3 dated Mar. 9, 2011.

*Primary Examiner* — Jimmy H Tran
(74) *Attorney, Agent, or Firm* — Foley and Lardner LLP; John D. Lanza

(57) ABSTRACT

Described are methods and systems for synchronizing client-side cookies with server-side cookies. A control that executes on a client computer within the context of a remote application, receives control input that is generated by a remote control that executes on a server within the remote application. In response to receiving the control input, the control generates a content request and forwards the content request to a synchronization agent that executes on the client computer. In many instances, the content request is a request for a cookie. Upon receiving the content request, the synchronization agent determines the type of content requested and responsively issues a synchronization request to a remote synchronization agent that executes on the server. The remote synchronization agent retrieves the requested content from the server and transmits the requested content to the synchronization agent. Upon receiving the requested content, the synchronization agent returns the content to the control.

20 Claims, 13 Drawing Sheets

(56) References Cited

U.S. PATENT DOCUMENTS

| | | | |
|---|---|---|---|
| 2003/0131045 A1* | 7/2003 | McGee et al. | 709/201 |
| 2004/0044731 A1* | 3/2004 | Chen et al. | 709/203 |
| 2004/0205263 A1* | 10/2004 | Sivaraman et al. | 710/21 |
| 2005/0198084 A1* | 9/2005 | Kim | 707/204 |
| 2006/0277536 A1* | 12/2006 | Stein et al. | 717/168 |
| 2007/0283011 A1* | 12/2007 | Rakowski et al. | 709/225 |
| 2008/0301222 A1* | 12/2008 | Schneider | 709/203 |
| 2009/0271771 A1* | 10/2009 | Fallows | 717/137 |
| 2009/0327905 A1* | 12/2009 | Mascarenhas et al. | 715/738 |
| 2012/0246117 A1* | 9/2012 | Clarke et al. | 707/634 |

* cited by examiner

SYNCHRONIZATION OF SERVER-SIDE COOKIES WITH CLIENT-SIDE COOKIES

RELATED APPLICATIONS

This U.S. patent application claims priority to U.S. Provisional Patent Application Ser. No. 61/246,710, filed on Sep. 29, 2009, the disclosure of which is considered part of the disclosure of this application and is herein incorporated by reference in its entirety.

FIELD OF THE DISCLOSURE

This application generally relates to synchronizing data between remotely located computers. In particular, this application relates to synchronizing cookies.

BACKGROUND OF THE DISCLOSURE

A number of different systems exist to remotely provide a client or other remote computer with application content generated by plugins, Flash, ActiveX controls, or other scripts executing within a browser or application. When remotely providing the application content generated by these scripts or sub-applications, graphical output can be captured and transmitted to a remote computer where the graphical output can be re-drawn. In other instances commands or script input can be captured, transmitted to a remote computer, and inputted into a similar script executing locally on the remote computer. Scripts or sub-applications such as plugins, Flash or ActiveX controls may use cookies or other cached data to execute. In some instances, when output generated by the scripts is transmitted to a remote machine, locally cached data or locally stored cookies are no longer available to the script output. Similarly, when script input is transmitted to a remote machine, locally cached data and locally stored cookies are not available to a script or plugin executing on the remote machine. Thus, when the script or plugin executes on the remote machine, the output generated by the script may differ from the output that would have been generated by a script executing on the local machine.

SUMMARY OF THE DISCLOSURE

In its broadest interpretation, the methods and systems described herein are embodiments of methods and systems for synchronizing client-side and server-side cookies. When script, control or plugin input is transmitted from a server or local machine or a client or remote machine, that input can be passed to a similar script, control or plugin executing on the remote machine. In many embodiments, the script, control or plugin may need access to a cookie in order to process the received input and execute properly. Thus, there exists a need for methods and systems for synchronizing cookies stored on a remote machine with cookies stored on a local machine. Synchronizing the cookies prior to processing the remotely-provided input can ensure that the script, control or plugin has access to any cookies that may be needed to properly process the input or execute properly.

In one aspect, described herein is a method for synchronizing server-side content with client-side content. A control executing on a client computer within the context of a remote application, receives control input generated by a remote control executing on a server within the remote application. The remote application executes on the server to generate application output that is then transmitted to a client computer and displayed on the client computer. In response to receiving the control input, the control generates a request for content and forwards that request to a synchronization agent that executes on the client computer. The synchronization agent receives the content request from the control and in response to receiving the content, determines the type of content requested by the control. Upon determining the type of content requested by the control, the synchronization agent issues a synchronization request to a remote synchronization agent that executes on the server. The synchronization agent receives the requested content from the remote synchronization agent that executes on the server, and returns the received content to the control executing on the client computer.

In some embodiments, issuing the synchronization request can include forwarding the content request generated by the control.

In other embodiments, the control executing on the client computer corresponds to the remote control executing on the server. In still other embodiments, the control can be a FLASH plugin.

The remote synchronization agent, in some embodiments, can respond to receiving the synchronization request from the synchronization agent executing on the client computer by retrieving the requested content. Retrieving the requested content, in some embodiments, can include retrieving the requested content from a storage repository on the server. In some embodiments, the remote synchronization agent transmits the retrieved content to the client computer.

The content, in some embodiments, comprises HTTP content. In other embodiments, the content comprises cookies.

In some embodiments, the received content can be stored in a storage repository on the client computer.

In another aspect, described herein is a system for synchronizing server-side content with client-side content. The system can include a client computer that communicates with a server over a virtual channel. The server can execute a remote application that can generate application output which can be transmitted to the client computer and remotely displayed on the client computer. The server can further execute a remote control within the remote application. The system can further include a control that executes on the client computer within the context of the remote application. The control can receive control input that is generated by the remote control and can generate a request for content in response to receiving the control input. The client computer can execute a synchronization agent that can receive the content request from the control. In response to receiving the content request, the synchronization agent can determine the type of content requested by the control. Upon determining the type of requested content, the synchronization agent can issue a synchronization request to a remote synchronization agent executing on the server. The synchronization agent can receive the requested content from the remote synchronization agent and can return the received content to the control.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for remoting multimedia plugin calls; and Section C describes embodiments of systems and methods for synchronizing client-side and server-side cookies.

Section A: Embodiments of a Network Environment and a Computing Environment

Figure 1A:
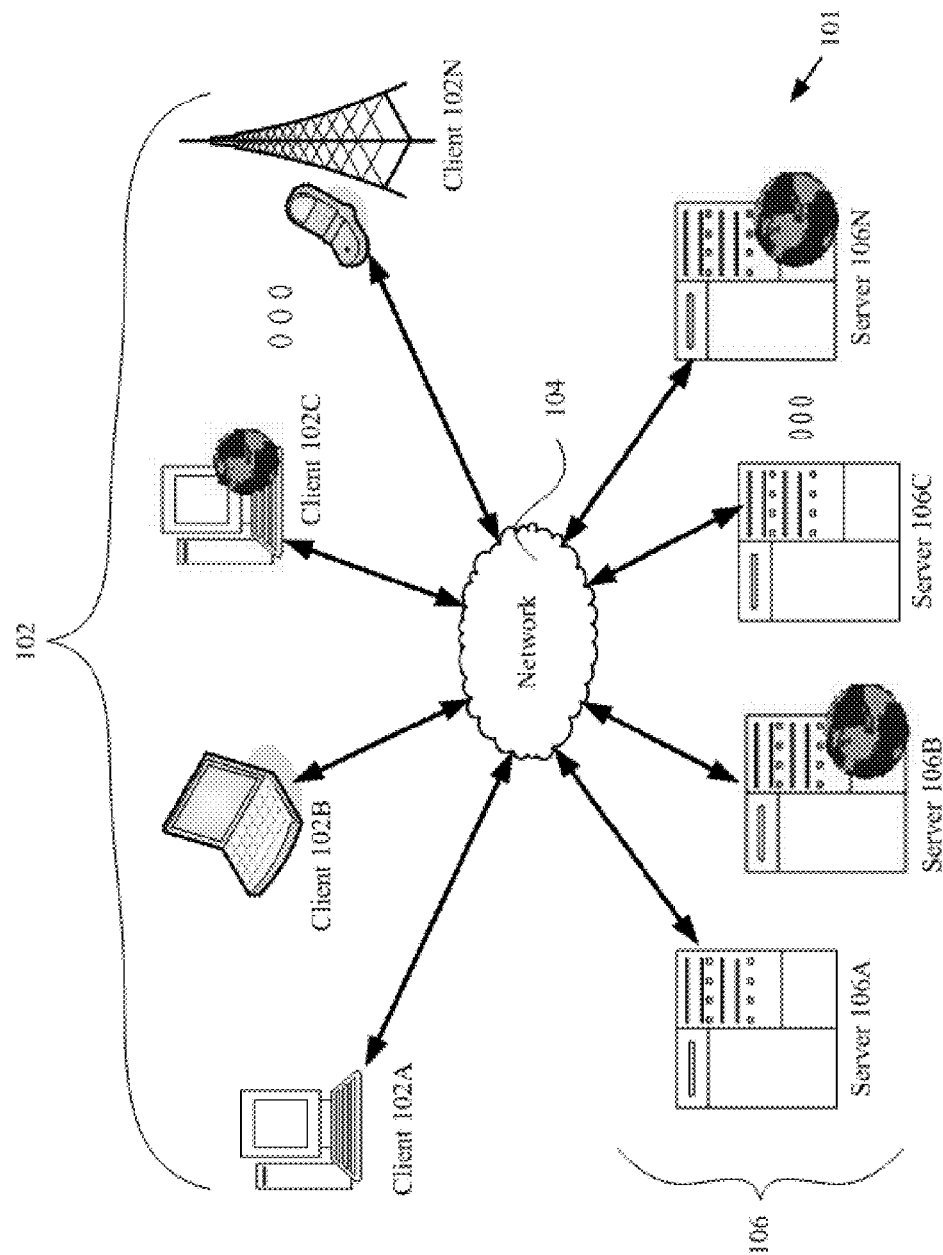
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
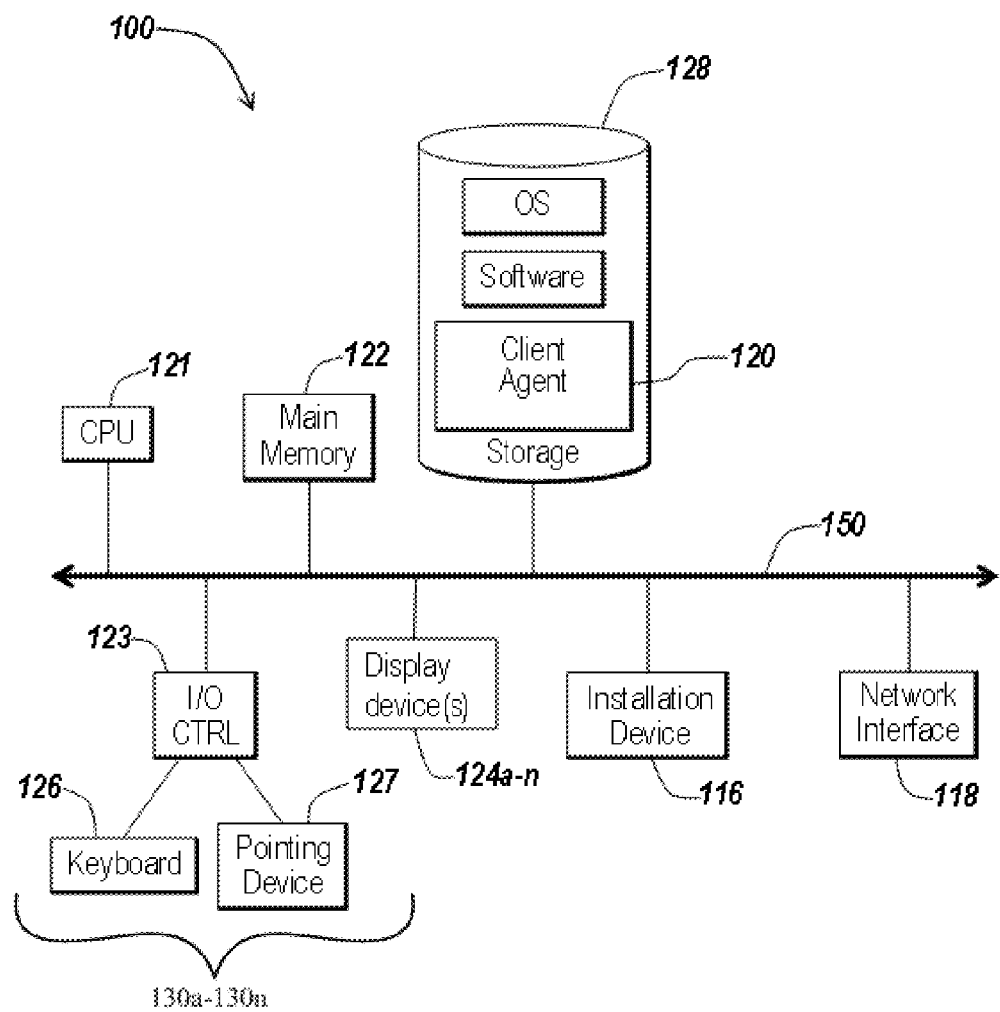
FIG. 1B and FIG. 1C depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
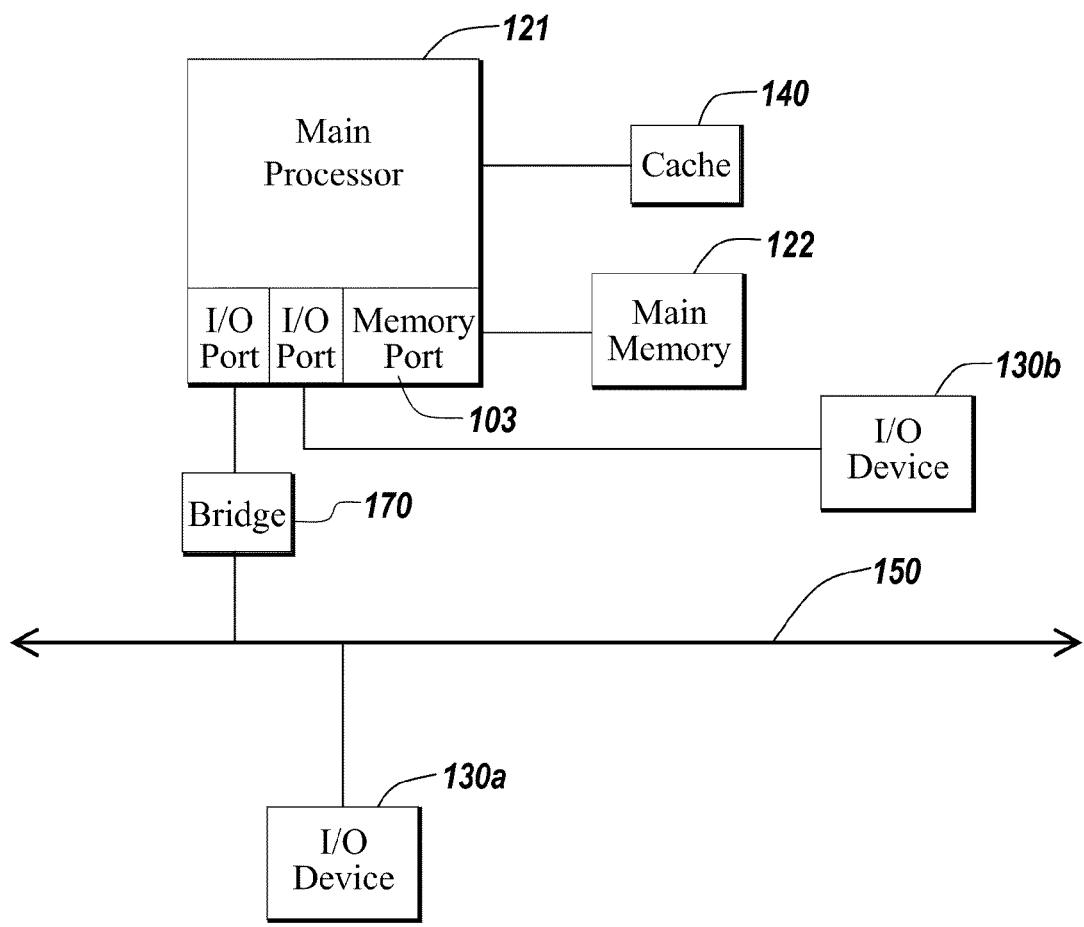

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-

124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a net book; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 1D:
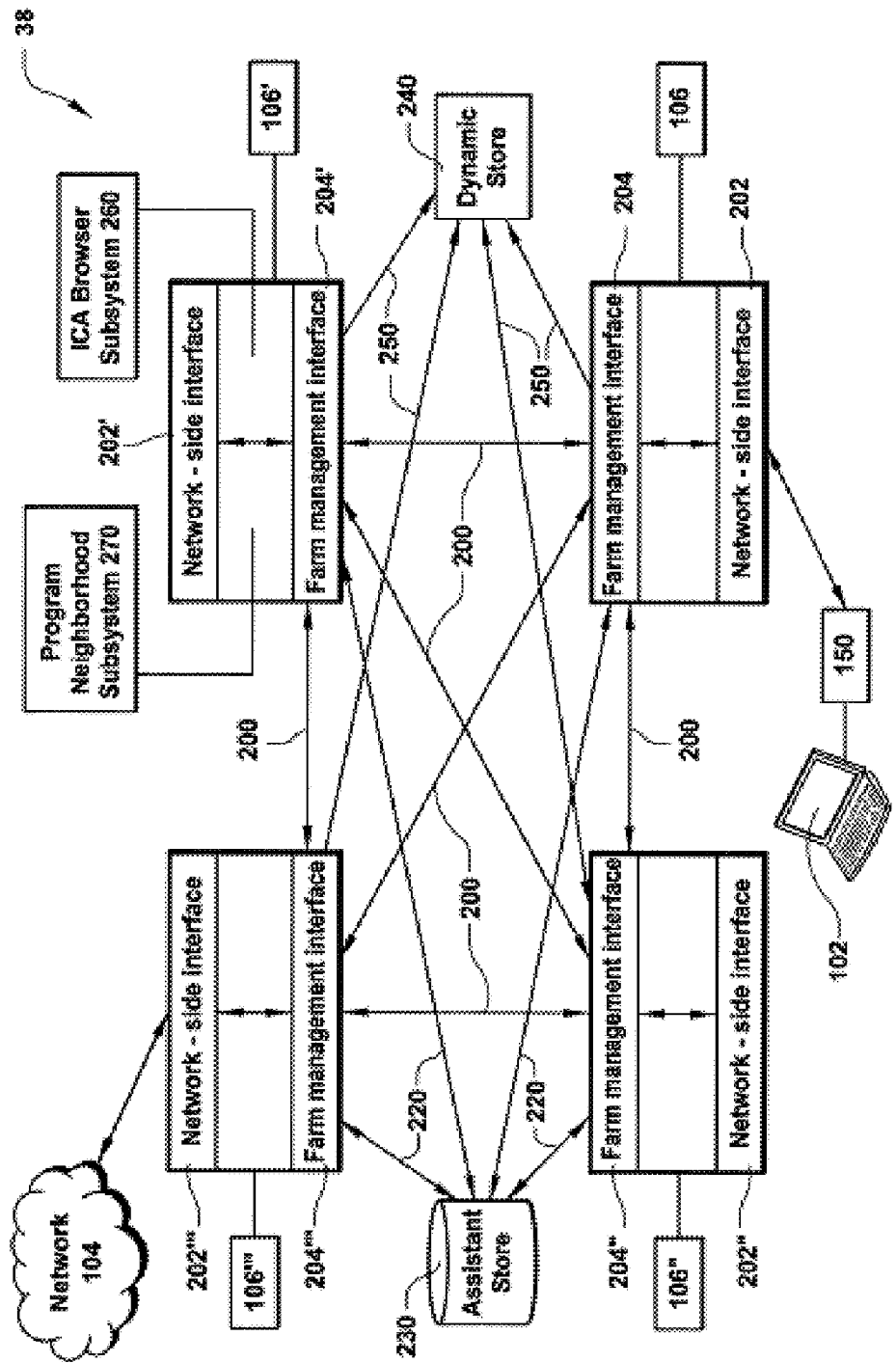
FIG. 1D illustrates a block diagram depicting an embodiment of a server farm.

Referring now to FIG. 1D, in some embodiments more than one server 106 can be logically linked to create a server farm 38, where each server 106 can include a network-side interface 202 and a farm-side interface 204. The network-side interface 202 can be in communication with one or more clients 102 or a network 104. The network 104 can be a WAN, LAN, or any other network described herein.

In one embodiment, each server 106 has a farm-side interface 204 that can connect with one or more servers 106 in the farm 38. In some embodiments, each server 106 can connect with another server 106 in the farm 38 via the other server's farm-side interface and such that both servers' farm-side interfaces 204 are interconnected. When connected, servers 106 within the server farm 38 can communicate with one another.

In some embodiments, the farm-side interface 204 can communicate with the network-side interface 202, a persistent store 230 and, in some embodiments, with a dynamic store 240. The farm 38, in some embodiments, can include a combination of servers 106, a persistent store 230, and a dynamic store 240. The server 106, in some embodiments, can communicate with the persistent store 230, while other servers 106' communicate with the server 106 to access information stored in the persistent store.

In one embodiment, the persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 can maintain static data associated with each server 106 in the farm 38, as well as the global data used by the servers 106 within the farm 38. In one embodiment, the persistent store 230 may maintain the server data in a Lightweight Directory Access Protocol (LDAP) data model. In other embodiments, the persistent store 230 can store the server data in an ODBC-compliant database. For the purposes of this description, the term "static data" can refer to data that does not change frequently, i.e., data that changes only on an hourly, daily, or weekly basis, or data that never changes. Each server can, in some embodiments, use a persistent storage subsystem to read data from and write data to the persistent store 230.

The data stored by the persistent store 230 may be replicated for reliability purposes either physically or logically. For example, physical redundancy may be provided using a set of redundant, mirrored disks, where each disk provides a copy of the data. In other embodiments, the database itself may be replicated using standard database techniques to provide multiple copies of the database. In further embodiments, both physical and logical replication may be used concurrently.

The dynamic store 240 can be centralized such that the runtime data is stored in the memory of one server 106 in the farm 38. That server can then operate as a master network node with which all other servers 106 in the farm 38 communicate when seeking access to runtime data. In another embodiment, each server 106 in the farm 38 can keep a full copy of the dynamic store 240 such that each server 106 communicates with every other server 106 to keep its copy of the dynamic store 240 up to date. In still another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to identify one or more servers hosting the requested application.

In some embodiments, heavy network traffic generated by farms 38 that have a large number of servers 106, can be alleviated by designating a subset of the servers 106 in the farm 38, typically two or more, as "collector points." A collector point, in some embodiments, can be a server 106 that collects and stores runtime data collected from other servers 106 in the farm 38. In some embodiments, each collector point can store a copy of the entire dynamic store 240, while in other embodiments, each collector point stores a portion of the dynamic store 240, i.e. the collector point maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 can be distributed amongst two or more servers 106 in the farm 38.

Servers 106 not designated as collector points can, in some embodiments, identify servers 106 that have been designated as collector points. Upon identifying these collector points, the servers 106 can communicates with the identified collector points to deliver and request runtime data. Using collector points, in one embodiment, can mitigate traffic caused by a large server farm 38 by allowing servers 106 to communicate with one or more collector points rather than every other server 106. Thus, requesting and delivering access to runtime data can be a less bandwidth intensive process.

Each server 106 can operate as a collector point for more than one type of data. For example, a first server 106" can operate as a collector point for licensing information and for loading information. In these embodiments, each collector point may amass a different type of run-time data. For example, a second server 106''' can collect licensing information, while the first server 106" collects loading information.

In some embodiments, each collector point can store data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

A client 102, in some embodiments, can view applications executing within the farm 38 and can access available information and application sessions executing within the farm 38, by browsing the contents and activity within a farm 38. In some embodiments, each server 106 can include an ICA browsing subsystem 260 that can provide the client 102 with browsing capabilities. After the client 102 establishes a connection with the ICA browser subsystem 260 of any of the servers 106, that browser subsystem can support a variety of client requests. Such client requests can include: (1) enumerating names of servers in the farm, (2) enumerating names of applications published in the farm, (3) resolving a server name and/or application name to a server address that is useful the client 102. The ICA browser subsystem 260 can also support requests made by clients 102 running a program neighborhood application that provides the client 102, upon request, with a view of those applications within the farm 38 for which the user is authorized. In some embodiments, the ICA browser subsystem 260 can forward all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete. The program neighborhood subsystem 270 can then request the program neighborhood information from the common application subsystem 524 associated with those accounts. The common application subsystem 524 can then obtain the program neighborhood information from the persistent store 230. On receiving the program neighborhood information, the program neighborhood subsystem 270 formats and returns the program neighborhood information to the client over the program neighborhood virtual channel. Then, in some embodiments, the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 can then send a request to the program neighborhood subsystem 270, which selects a server 106 in the farm 38. Address information associated with the server 106 can be identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel can be established, where the connection can remain open for as long as the ICA connection persists. Over this program neighborhood virtual channel, the program neighborhood subsystem 270 can push program neighborhood information updates to the client 102. To obtain updates, the program neighborhood subsystem 270 subscribes to events from the common application subsystem 524 to allow the program neighborhood subsystem 270 to detect changes to published applications.

Section B: Systems and Methods for Remoting Multimedia Plugin Calls

Figure 2:
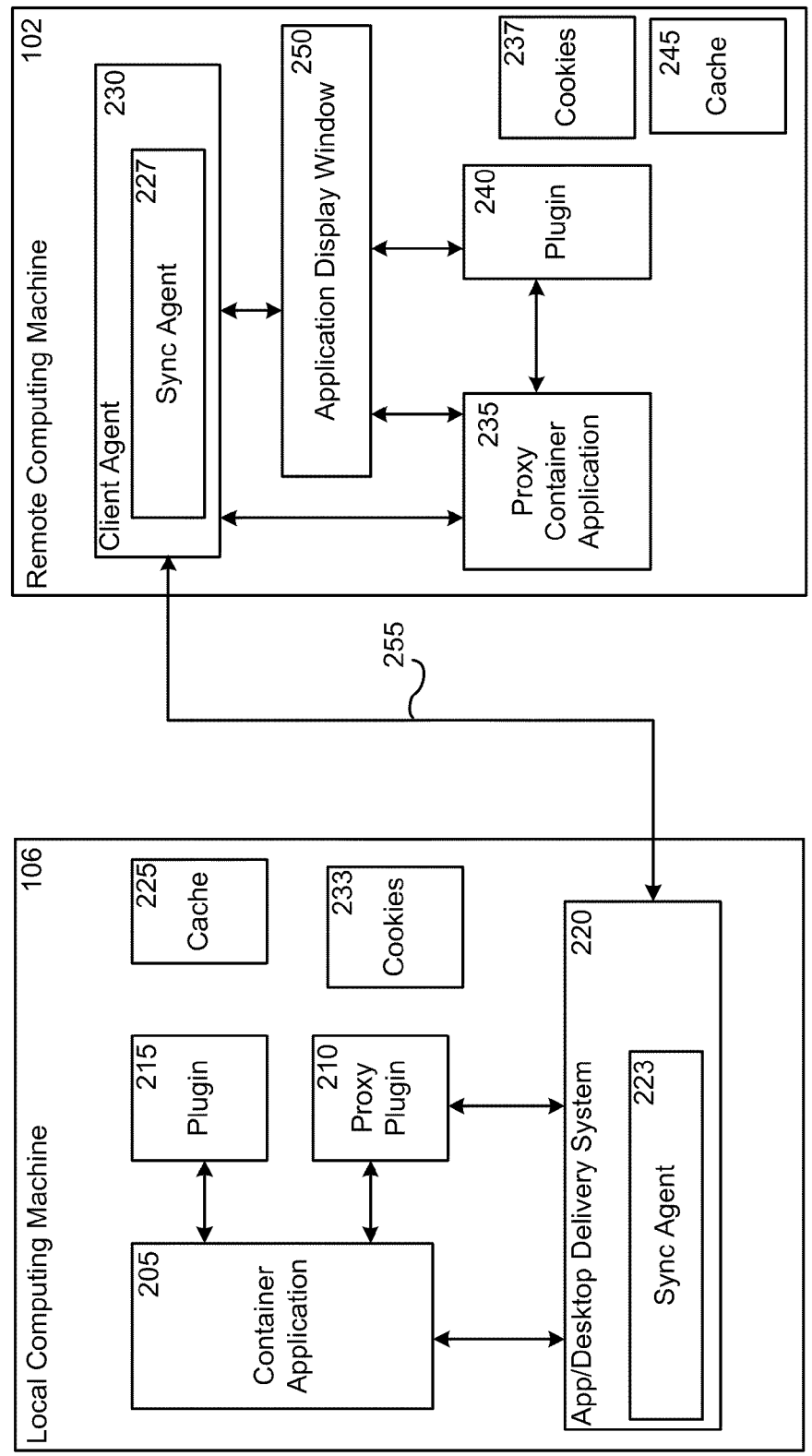
FIG. 2 illustrates a block diagram depicting an embodiment of a system for remoting multimedia plugin calls.

Illustrated in FIG. 2 is a block diagram depicting an embodiment of a system for remoting multimedia plugins. The system can include a local computing machine 106 communicating with a remote computing machine 102 over a virtual communication channel 255 and via a presentation level protocol. Executing on the local computing machine 106 is a container application 205, a plugin 215 and a proxy plugin 210, where the plugin 215 and the proxy plugin 210 can communicate with the container application 205. Communicating with the container application 205 and the proxy plugin 210 is an application/desktop delivery system 220 that can communicate over the virtual communication channel with a client agent 230 executing on the remote computing machine 102. An application display window 250 and proxy container application 235 communicate with the client agent 230. The proxy container application 235 also communicates with the application display window 250 and a plugin 240. Included on both the local and remote computing machines 106, 102 is cache 225, 245 memory. In some embodiments, the application/desktop delivery system 220 can include a synchronization agent 223, while in other embodiments, the client agent 230 can include a synchronization agent 227. Included on both the local and remote computing machines 106, 102 can be cookies 233, 237.

Further referring to FIG. 2, and in more detail, in one embodiment the local computing machine 106 can be any of the computing machines described above. In one embodiment the local computing machine 106 is a server. In other embodiments, the local computing machine 106 can be referred to as either a first computing machine or a second computing machine. In some embodiments, the local computing machine 106 is a server 106 that can be any one of an application server, a server within a server farm or any other type of server able to provide content to clients connected to the server 106. The local computing machine 106, in most embodiments, can communicate with the remote computing machine 102 over a network 104 such as any of the networks described herein.

The remote computing machine 102 can in some embodiments, be any one of the computing machines described above. In one embodiment, the remote computing machine 102 is a client 102, while in other embodiments the remote computing machine 102 can be either one of a first computing machine or a second computing machine. In some embodiments, the client 102 can be a hand-held computing device such as any of the hand-held devices described herein. The remote computing machine 102 can communicate with the local computing machine 106 over a network 104 such as any of the networks described herein.

Although FIG. 2 illustrates a local computing machine 106 and remote computing machine 102, in some embodiments the local computing machine 106 can be referred to as a server 106 or remote computer and the remote computing machine 102 can be referred to as a client computer 102. In these embodiments, applications executing on the server 106, e.g. container applications 205, can generate application output that is transmitted over the virtual channel 255 to the client computer 102.

In some embodiments, the virtual communication channel 255 is an ICA channel. Thus in these embodiments, communication between the local computing machine 106 and the remote computing machine 102 over the virtual communication channel 255 takes place using a presentation level protocol such as the ICA protocol created by CITRIX SYSTEMS. In some embodiments, the local computing machine 106 and the remote computing machine 102 can communicate via RDP, PCAnywhere, or any other presentation level protocol. The virtual communication channel 255 can be established, in some embodiments, over a network 104 such as any of the networks described herein. The communication channel 255 can be a virtual channel, a virtual communication channel, a channel, a virtual communication connection or any other communicative connection between the remote computing machine 102 and the local computing machine 106.

Communication over the virtual communication channel 255 can be facilitated by an application/desktop delivery system 220 and a client agent 230. The application/desktop delivery system 220 executes on the local computing machine 106 and operates to route information from the local computing machine 106 to the remote computing machine 102 over the communication channel 255. In particular, the application/desktop delivery system 220 can receive graphical application output from the container application 205 and transmit the graphical application output to the client agent 230 executing on the remote computing machine 102. The client agent 230 can then display the received graphical application output in the application display window 250 executing on the remote computing machine 102. In some embodiments, the application/desktop delivery system 220 can receive calls, requests and other information from the proxy plugin 210 on the local computing machine 106 and transmit the calls, requests and other information to the client agent 230 which relays the call, request or information to the proxy container application 235.

While FIG. 2 illustrates an application/desktop delivery system 220 that communicates with the container application 205, other embodiments include an application/desktop delivery system 220 that receives graphical application output from any number of applications executing on the local computing machine 106. The application/desktop delivery system 220 receives the graphical application output and transmits the output to the client agent 230 which then forwards the output to the appropriate application display window 250 where the output is displayed.

In some embodiments, the application/desktop delivery system 220 communicates with other applications or storage repositories on the local computing machine 106. The proxy plugin 210, in one embodiment, can forward to the application/desktop delivery system 220 any of: a call issued by the plugin 216; a request for media or multimedia content issued by the container application 205; window information obtained by the proxy plugin 210; a scripting interface obtained by the proxy plugin 210; graphical output stored in cache 225; graphical commands or window information stored in cache 225; and any other stored information or requests issued by objects executing on the local computing machine 106. The application/desktop delivery system 220 can transmit any of the received stored information, received commands or requests to the client agent 230 executing on the remote computing machine 102. In one embodiment, the remote computing machine 102 can receive the information and either relay the information to an object executing on the remote computing machine 102 or display the graphical output in the application display window 250.

In one embodiment, a container application 205 executes on the local computing machine 106. This container application 205 can be any application described herein. In particular, the container application 205 can be: a browser application; a MICROSOFT OFFICE application; an ADOBE application; a GOOGLE application; a web application; a cloud application; an application executing on a computing machine remotely located from the local computing machine 106 (i.e. a third or fourth computing machine); or any other application able to execute a plugin and display the results of the plugin execution. For example, the plugin can be an INTERNET EXPLORER browser application executing a FLASH player.

In some embodiments, the container application 205 can execute on a server 106 and can be referred to as a remote application 205. In these embodiments, the container application 205 can execute to generate application output, e.g. graphics and drawing commands that can be used to generate a display of the application on a display of the server 106. The application output can be captured, retrieved or intercepted by the application/desktop delivery system 220 or any remote presentation application and can be transmitted over the virtual channel 255 to the client computer 102. In one embodiment, the client agent 230 can receive the application output and forward the application output to a desktop manager which can then display the application output in an application display window 250. In some embodiments, one or more plugins (i.e. controls) 215 can execute within the container application 205 executing on the server 106. These plugins 215 can execute within the actual container application 205. In some instances, the plugins 215 executing within the container application 205 can correspond to a plugin 240 (i.e. control) executing on the client computer 102. In these instances, the plugin 240 executing on the client computer 102 can be the same script or plugin 240 as the plugin 215 executing on the server 106 within the container application 205 (e.g. remote application 205). The plugin 240 can execute within the context of a remote display of the container application 205. In some embodiments, a plugin 240 can execute within the context of a remotely displayed application when that plugin 240 executes on a client computer 102 to generate application output that can be displayed within the remote displayed application output of the container application 205. For example, the application output generated by the container application 205 can be displayed within the application display window 250 on the client computer 102. This application output can include holes or empty sections that typically would include output generated by the plugin 215 executing on the server 106. However, in this example the application output is displayed on the client computer 102 with the holes or empty sections and the plugin 240 executing on the client computer 102 can execute to generate application output that can then be displayed in the holes or empty sections. The plugin 240 executing on the client computer 102 generates application output in response to and using the control input received by the plugin 215 on the server 106. Thus, the control input typically input into the server plugin 215 can be intercepted and forwarded to the client plugin 240. In turn, the client plugin 240 can receive the control input and process the control input to generate application output information (e.g. graphics and draw commands). Thus, executing within the context of a remotely displayed application can include generating application output and displaying that output amongst the remotely displayed application output of the remotely executing application.

The plugin 215, in some embodiments, can be an ACTIVEX control such as a FLASH player. The plugin 215 can also be any one of: an ACTIVEX application or control; a JAVA applet; an ACTIVEX DATA OBJECT; a DIRECT SHOW object; ACTIVE scripting; and any other embedded or linked control or sub-application able to operate within the methods and systems described herein. In one embodiment, the plugin 215 executes within the context of the container application 205. In other embodiments the plugin 215 is linked to the container application 205 such that the plugin 215 executes as though it were included within the container application 205. While FIG. 2 depicts a local computing machine 106 having a plugin 215, in some embodiments the local computing machine 106 does not execute or otherwise have a plugin 215.

The plugin 240 on the remote computing machine 102 can, like the plugin 215, be an ACTIVEX control such as a FLASH player. The plugin 240 can also be any one of: an ACTIVEX application or control; a JAVA applet; an ACTIVEX DATA OBJECT; a DIRECT SHOW object; ACTIVE scripting; and any other embedded or linked control or sub-application able to operate within the methods and systems described herein. In one embodiment the plugin 240 is associated with or linked to the proxy container application 235. In other embodiments the plugin 240 executes as though it were included within the proxy container application 235.

In some embodiments, the plugin 215 executing on the server 106 can be referred to as a remote control, while the plugin 240 executing on the client computer 102 can be referred to as a control. In other embodiments, either plugin 215, 240 can be referred to as a control and can execute within the context of a remotely displayed application or within an application. Each control 215, 240 can receive control input, e.g. commands and data, from a container application 205 and can use the control input to generate output such as application display output and/or data. While in some embodiments, a local control 240 can receive the control input passed to a remote control 215, in other embodiments the remote control 215 can process the control input before forwarding the control input to the local control 215.

The proxy plugin 210, in some embodiments, corresponds to the plugin 215. In other embodiments, the proxy plugin 210 corresponds to the plugin 240 executing on the remote computing machine 102. The proxy plugin 210 can install itself on the local computing machine 106 much the same way that a plugin would install itself on a computing machine. By doing this, the proxy plugin 210 is treated by the operating system on the local computing machine 106 and more importantly by the container application 205 like a fully installed plugin application. Each time the container application 205 issues requests or calls to the plugin corresponding to the proxy plugin 210, the proxy plugin 210 can intercept the request or call and either respond to the request or call, or relay the request or call to a plugin 240 executing on the remote computing machine 102. The proxy plugin 210 can correspond to the plugin 240 such that the proxy plugin 210 can represent any of: an ACTIVEX application or control; a JAVA applet; an ACTIVEX DATA OBJECT; a DIRECT SHOW object;

ACTIVE scripting; and any other embedded or linked control or sub-application able to operate within the methods and systems described herein.

In some embodiments, the proxy plugin 210 is a plugin binary (i.e. a COM server *.dll file) that is installed on the local computing machine 106. By installing a plugin binary on the local computing machine 106, the proxy plugin 210 appears to the container application 205 as though the proxy plugin 210 were an actual plugin application. Thus, all calls to the plugin are re-routed, passed or otherwise proxied to the proxy plugin 210. For example, the container application 205 can be an INTERNET EXPLORER browser application executing a proxy plugin 210 that is a FLASH player. The FLASH player proxy plugin 210 intercepts calls to the FLASH player issued by a page executing within the INTERNET EXPLORER browser, and forwards the calls to the proxy container application 235 executing on the remote computing machine 102. The proxy container application 235, which corresponds to the INTERNET EXPLORER browser container application 205 executing on the local computing machine 106, issues the call to the plugin 240 on the remote computing machine 102. The plugin 240, a FLASH player on the remote machine 102, generates multimedia content based on the call and displays the content within a plugin window either on the remote computing machine 102 or within the application display window 250. The resulting page is an HTML page displaying FLASH content within an HTML page displayed on the remote computing machine 102, where the HTML page is generated on the local computing machine 106 and the FLASH content is generated on the remote computing machine 102.

In one embodiment, the proxy plugin 210 can gather and obtain window data associated with the container application 205 and the plugin 215 on the local computing machine 106. The container application 205, in one embodiment, executes within a container window on the local computing machine 106. This container window (Not Shown) can be associated with window data, such as: the position of the container window on a desktop; the size of the window; whether the container window is maximized or minimized; and any other window data relevant to the display of the container application 205. Similarly, there can be plugin window data associated with the display of the plugin content within the container application 205 and therefore within the container window. In some embodiments, the plugin window data can include: the position of the plugin's graphics region within the container window (i.e. the location within the container window where the plugin's output is displayed;) the size of the graphics region where the plugin's output is displayed; a clipping region associated with the plugin's graphical output region; and any other window data relevant to displaying the plugin output in the container window.

The proxy plugin 210, in some embodiments, can query the container application 205 for information about the plugin window data. This query, in one embodiment, can be an interface call issued by the proxy plugin 210 to the container application 205. Similarly, the query can in some embodiments be a query to the operating system executing on the local computing machine 106 for information regarding plugin window data. Responsive to this query, the container application 205 can transmit the plugin window data to the proxy plugin 210 which can then transmit the plugin window data to the plugin 240 on the remote computing machine 102. Once the remote plugin 240 receives the plugin window data, the plugin 240 can configure or compose itself in accordance with the container application 205 on the local computing machine 106. In some embodiments, the plugin window data can be transmitted to the remote plugin 240 via a remote presentation protocol, in other embodiments additional protocol commands are included within the window data so that the remote plugin 240 can receive and interpret the plugin window data.

The proxy plugin 210 can in some embodiments correspond to the plugin 240 executing on the remote computing machine 102. Each of the proxy plugin 210 and the plugin 240 can be referred to as a graphical plugin, a media plugin, a multimedia plugin, a remote plugin, or a local plugin. The plugin 210, 240 can generate any of the following types of content: graphical; multimedia; audio; video; media; or any other type of content able to be generated by a plugin application. The plugin 210, 240 can communicate with cache 225, 245 to retrieve graphical or multimedia content, or to retrieve other information requested by a container application 205. The plugin 210, 240 can communicate with other components of the computing machines including the operating system, a desktop application and any other applications executing on the computing machines.

In one embodiment, cache 225, 245 is included on the local computing machine 106 and the remote computing machine 102. The cache 225, 245 can comprise any storage repository able to store graphical content, multimedia content; window data; graphics commands and any other information or content used by the methods and systems described herein. The contents of the cache 225 on the local computing machine 106 can in some embodiments be identical to the contents of the cache 245 on the remote computing machine 106. In other embodiments, call responses or repetitively requested graphical or multimedia content, window data or scripting information can be stored in either cache 225, 245. The proxy plugin 210 or the proxy container application 235 can retrieve this content from cache 225, 245 and respond to calls issued by the container application 205 and/or the plugin 240 by retrieving the requested content from cache 225, 245.

Executing on the remote computing machine 102, in one embodiment, is an application display window 250. The application display window 250 can display graphical application output generated by applications executing on the local computing machine 106 and transmitted to the application display window 250 over the virtual channel 255. In one embodiment, the proxy container application 235 communicates with the application display window 250 such that the proxy container application 235 forwards plugin 240 output to the application display window 250 for display.

The proxy container application 235 can correspond to the container application 205 executing on the local computing machine 106 such that the proxy container application 235 represents substantially the same application as the container application 205. In one embodiment, the proxy container application 235 can register with an operating system executing on the remote computing machine 102 so that the proxy container application 235 appears as though it is a full install of the container application. In such an embodiment, the proxy container application 235 can be an executable binary that executes on the remote computing machine 102 either as a separate process controlled by the client agent 230 or as a part of the client agent 230. Installing the proxy container application 235 as though it were a full install of the container application allows the plugin 240 on the remote computing machine 102 to interact with the proxy container application 235 as though the proxy container application 235 were the container application 205.

In some embodiments, the proxy container application 235 and the proxy plugin 210 contain the same COM and DCOM interfaces as the container application 205 and the plugin 240.

Thus calls issued by the container application 205 to COM and DCOM interfaces on the plugin 240 can be similarly issued to the COM and DCOM interfaces on the proxy plugin 210. Conversely, calls issued by the plugin 240 to the COM and DCOM interfaces on the container application 205 can be similarly issued to the COM and DCOM interfaces on the proxy container application 235.

In many embodiments, the proxy container application 235, the container application 205, the plugin 240 and the proxy plugin 210 can use MICROSOFT COM and DCOM technology to issue and receive calls. In other embodiments, the proxy container application 235, the container application 205, the plugin 240 and the proxy plugin 210 can use another inter-process or inter-application communication standard able to relay messages from one object to another.

In one embodiment, the application/desktop delivery system 220 can include a synchronization agent 223. In other embodiments, the client agent 230 can include a synchronization agent 227. In one embodiment, the synchronization agent 223 executing on a local or client computer 106 can be referred to as the synchronization agent 223. While in other embodiments the synchronization agent 227 executing on the remote computer 102 can be referred to as the remote synchronization agent 227. The synchronization agent 223, 227 can be an application or program executed by the local computing machine 106 or the remote computing machine 102 as a stand-alone application, or executed as a sub-routine or sub-program of the application/desktop delivery system 220 or the client agent 230. In some embodiments, the synchronization agent 223, 227 can retrieve cookies, HTTP content or other cached data from a remote computing machine and update the locally stored cookies, HTTP content or local cache with the retrieved data. In one embodiment, the synchronization agent 223, 227 can retrieve a particular cookie, HTTP content or set of cached data from a remote machine, while in other embodiments the synchronization agent 223, 227 can retrieve all of the cookies or cached data from a remote machine. In still another embodiment, the synchronization agent 223, 227 can retrieve a list or group of cookies or cached data corresponding to a particular transaction, application request or user.

The synchronization agent 223, 227, in some embodiments, can retrieve cookies or cached data in response to a request for information. When an application requires HTTP (hyper-text transport protocol) content such as cookies, the application may try to retrieve this content from local memory. In some embodiments, the synchronization agent 223, 227 intercepts this request or responds to an interception of this request by accessing a remote memory and retrieving the requested HTTP content from that remote memory location. The remote memory location, in some embodiments, may be cache or memory on a remote computing machine. The HTTP content can be cookies or cached data.

In some embodiments, the synchronization agent 223, 227 can communicate with other synchronization agents to provide those agents with requested cookies, cached data or HTTP content. For example, a synchronization agent 227 executing on the remote computing machine 102 can contact a synchronization agent 223 executing on the local computing machine 106 to request HTTP content. In some embodiments, the synchronization agent 227 on the remote computer 102 initiates communication with the synchronization agent 223 on the local computer 106 upon intercepting a request to fetch a cookie. The synchronization agent 227 responds to intercepting this request by establishing a communication connection with the synchronization agent 223 on the local computer 106, and receiving from the synchronization agent 223 either the requested HTTP content or an update corresponding to the requested HTTP content. In some embodiments, the synchronization agent 227 can request a cookie or data that corresponds to the HTTP content requested by the script, plugin or ActiveX control. In other embodiments, the synchronization agent 227 can request all cookies and HTTP content stored on the local computer 106.

In some embodiments, each of the local computing machine 106 and the remote computing machine 102 store cookies 233, 237. Cookies 233, 237, in some embodiments, can be HTTP content or other data types. In one embodiment, the cookies 233, 237 can be textual data stored in cache on the computing machine 106, 102. In other embodiments, the cookies 233, 237 can be cached data items used by plugins, ActiveX controls or other scripts. In still other embodiments, the cookies 233, 237 can be HTTP content used by plugins, ActiveX controls or other scripts. In one instance, the cookies 233, 237 can be stored in cache, while in other embodiments the cookies 233 237 can be stored in memory on the computing machine.

HTTP cookies, in some embodiments, can be generated during user authentication. Subsequent to authenticating a user, an HTTP authentication cookie can be stored in local memory or in a remote memory location, and can be used during subsequent authentications of that user. When a user accesses the server via another client, the server can retrieve the authentication cookie from the server and set the cookie on the client so that the user can be authenticated to the server. While in some embodiments cookies can be used to authenticate clients to servers, in other embodiments cookies can be used to authenticate servers to servers and clients to clients.

Figure 3A:
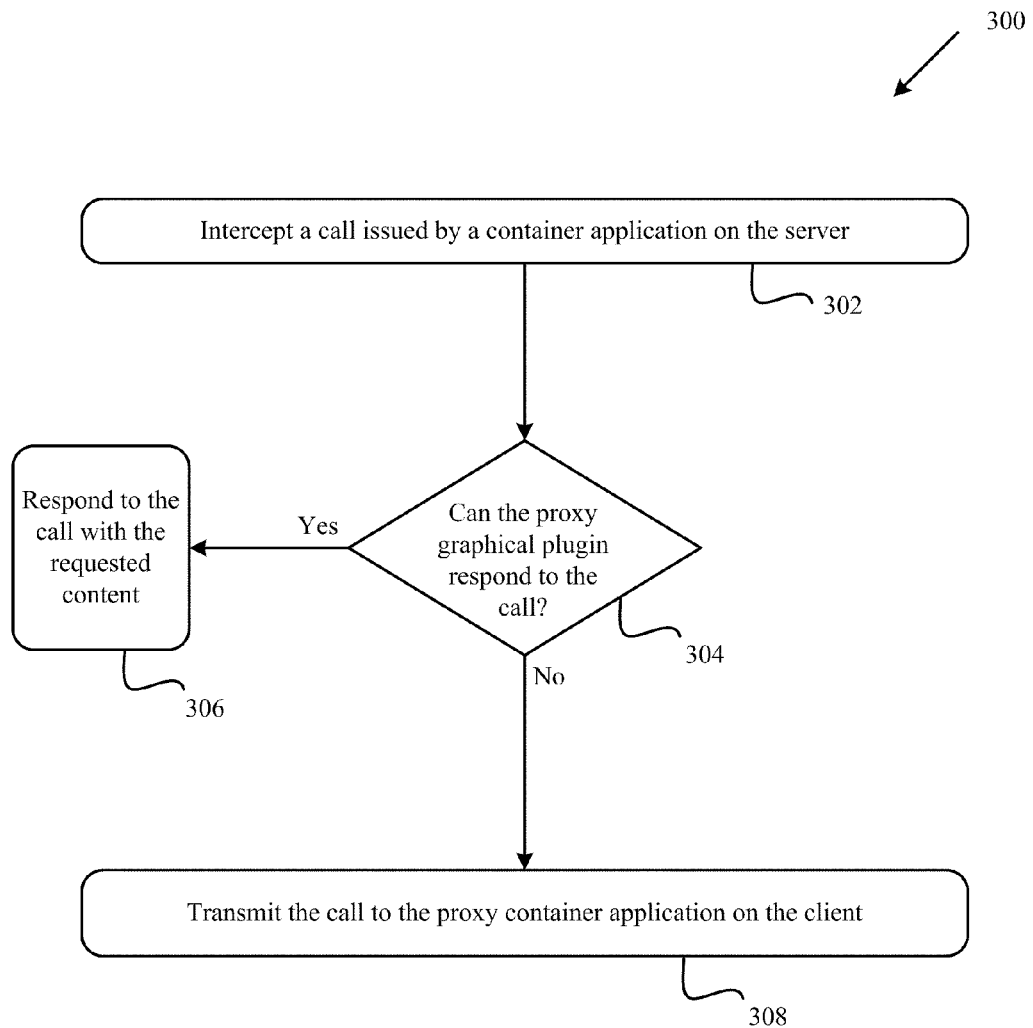
FIG. 3A illustrates a flow diagram depicting an embodiment of a process for remoting a call to a multimedia plugin.

Illustrated in FIG. 3A is an embodiment of a process 300 for remotely providing a call issued by a container application to a plugin. A proxy plugin 210 executing on the local computing machine 106 can intercept calls issued by a container application 205 executing on the local computing machine 106 (Step 302). Once a call is intercepted, the proxy plugin 210 can then determine whether the proxy plugin 210 can respond to the issued call (Step 304). If the proxy plugin 210 can respond to the issued call, then the proxy plugin 210 responds to the call with the requested content (Step 306). Otherwise, if the proxy plugin 210 cannot respond to the call, the proxy plugin 210 transmits the call to a proxy container application 235 executing on a remote computing machine 102 (Step 308).

Referring to FIG. 3A, and in more detail, in one embodiment the proxy plugin 210 can intercept calls issued by the container application 205 to the plugin 240 (Step 302). Calls issued by the container application 205 can include any of the following: a request for access to the plugin 240; a request to access a particular interface on the plugin 240; a request for graphical or multimedia content generated by the plugin 240; a request for access to a scrip executing within the plugin 240; or any other call or request requiring the plugin 240 to generate either content or a response to the call. In some embodiments the proxy plugin 210 can intercept the calls issued by the container application 205, while in other embodiments the container application 205 can issue the calls to a plugin 215 executing on the local computing machine 106. In this embodiment, the plugin 215 can then forward all calls to the proxy plugin 210. The proxy plugin 210, in other embodiments, can intercept the calls or requests issued by the container application 205 before they are received by the plugin 215. In this embodiment, the proxy plugin 210 can hook onto an application program interface on the container application 205 so that they proxy plugin 210 can intercept any calls issued by the container application 205.

Once the proxy plugin 210 intercepts the calls issued by the container application 205, the proxy plugin 210 then determines whether the proxy plugin 210 can respond to the call (Step 304). Determining whether the proxy plugin 210 can respond to a call can include reviewing the contents of cache 225 on the local computing machine 106 to determine whether a cached response has been saved on the local computing machine 106. The proxy plugin 210 can in some embodiments query a table to determine whether the proxy plugin 210 can respond. In such an embodiment, each time a response is saved in cache an entry is inserted into the table indicating the particulars of the call (i.e. the request, the requested plugin interface, metadata accompanying the request) and the memory location of the response. Reviewing this table can both instruct the proxy plugin 210 as to whether the proxy plugin 210 can respond to the call, and can inform the proxy plugin 210 where the response is located in cache (i.e. the response's memory location in cache). Using the retrieved memory location, the proxy plugin 210 can retrieve the response from cache 225 and respond to the container application 205 with the retrieved response (Step 306). In other embodiments, the proxy plugin 210 can determine whether the proxy plugin 210 can respond by searching through the cache 225 and retrieving the response once it is located. If a response is located, then the proxy plugin 210 can respond. Conversely, if a response is not found then the proxy plugin 210 cannot respond.

When the proxy plugin 210 determines that the proxy plugin 210 cannot respond, then the proxy plugin 210 can transmit the call to the proxy container application 235 (Step 308) executing on the remote computing machine 102. In some embodiments, transmitting the call to the proxy container application 235 can include transmitting the call over the virtual channel 255 to the client agent 230. The client agent 230 can then either relay or otherwise forward the call to the proxy container application 235, or in some embodiments, can forward the call to the plugin 240 executing on the remote computing machine 102. In some embodiments, transmitting the call to the proxy container application 235 includes compressing, encoding and/or encrypting the call prior to transmitting the call over the virtual channel 255.

Figure 3B:
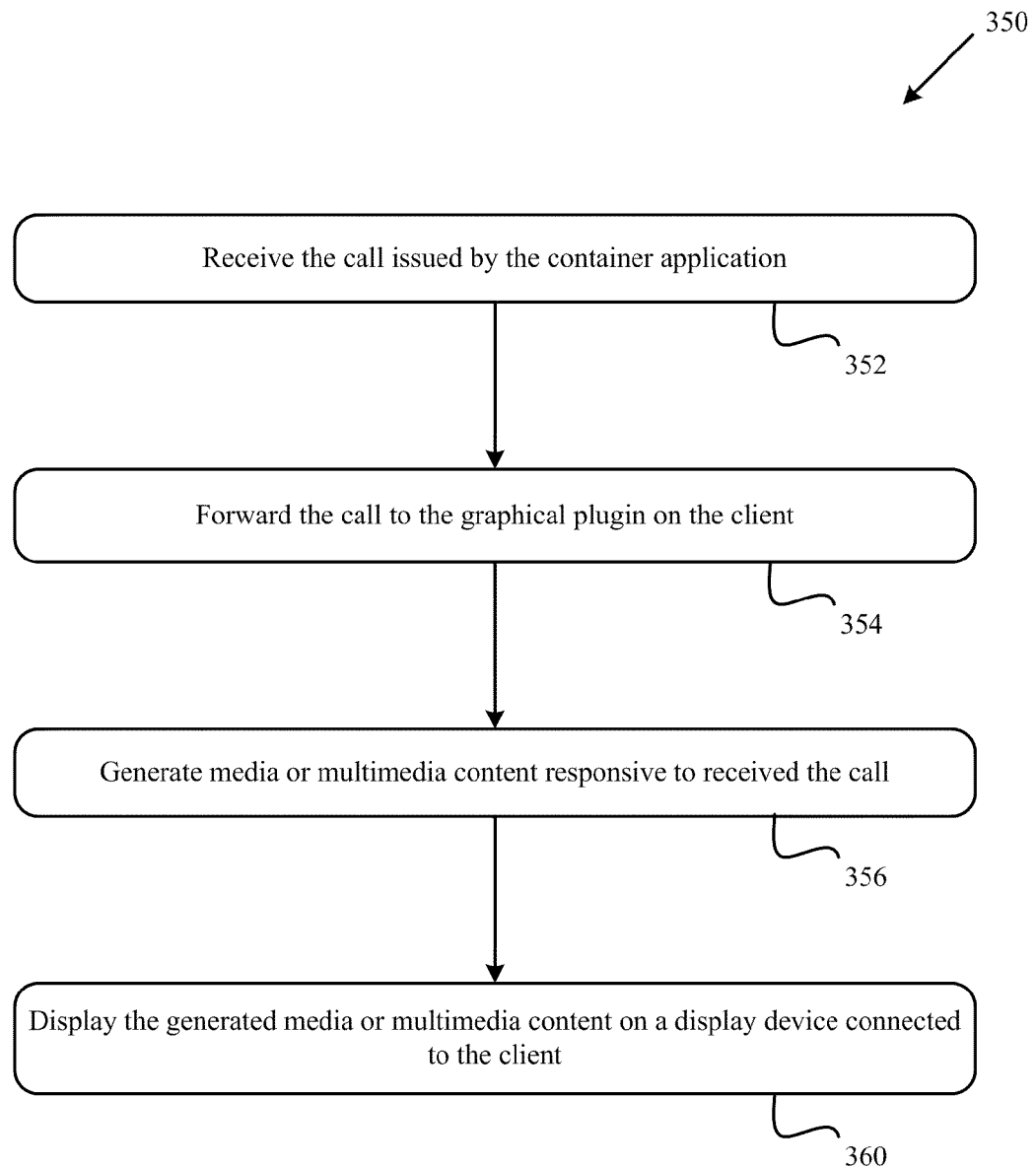
FIG. 3B illustrates a flow diagram depicting an embodiment of a process for responding to a remoted call to a multimedia plugin.

Illustrated in FIG. 3B is one embodiment of a process 350 for receiving a call issued to a plugin 240. A proxy container application 235 executing on the remote computing machine 102 can receive a call issued by the container application 205 (Step 352). This proxy container application 235 forwards the call to the graphical or multimedia plugin 240 executing on the remote computing machine 102 (Step 354). The graphical plugin responds to the call by generating media or multimedia content (Step 356) and the generated media or multimedia content is displayed on a display device connected to the remote computing machine 102 (Step 358).

Further referring to FIG. 3B, and in more detail, in one embodiment a proxy container application 235 executing on the remote computing machine 102 receives the call issued by the container application 205 (Step 352). In other embodiments, the client agent 230 receives the call issued by the container application 205. Once the client agent 230 receives the call, the client agent 230 forwards the call to the plugin 240 (Step 354). In some embodiments, the proxy container application 235 receives the call from the proxy plugin 210, while in other embodiments the proxy container application 235 receives the call from the client agent 230. The client agent 230 can receive the call from either the application/desktop delivery system 220 or the proxy plugin 210. Receiving the call can include receiving metadata associated with the call. In some embodiments, the proxy container application 235 forwards the call and the metadata to the plugin 240. In still other embodiments, receiving the call can include receiving a first call issued by the container application 205, while a subsequent received call can be referred to as a second call issued by the container application 205.

Once the proxy container application 235 receives the call, the proxy container application 235 can forward or issue the call to the graphical plugin 240 executing on the remote computing machine 102 (Step 354). When the call is received by the client agent 230, the client agent 230 can either forward or issue the call to the plugin 240 or forward the call to the proxy container application 235. In most embodiments, the proxy container application 235 forwards or issues the call to the plugin 240. The client agent 230, in some embodiments, decodes, decrypts and/or decompresses the call and any associated metadata prior to forwarding the call to either the proxy container application 235 or the plugin 240.

After the call is issued to the plugin 240, the plugin 240 processes the call and any associated metadata to generate either a response or content (Step 356). The content can include media content, graphical content, multimedia content, audio content or any other content requested by the container application 205. Generating a response can include responding with configuration information, security information, script output, or window data specific to the plugin 240. In most embodiments, the plugin 240 generates a response or content responsive to receiving the call.

The content generated by the plugin 240 can be displayed on a display device connected to the remote computing machine 102 (Step 360). In some embodiments, the plugin 240 displays the media or multimedia content within a plugin window or graphical output section or canvas positioned within the container application window. This container application window is further displayed on a display device connected to the remote computing machine 102. Thus, when the container application window containing the plugin window is displayed on the display device, the plugin window and generated media or multimedia content is also displayed on the display device connected to the remote computing machine 102. When the generated content is audio content, the content can be played by the remote computing machine 102 such that it is played through speakers connected to the remote computing machine 102.

Figure 4:
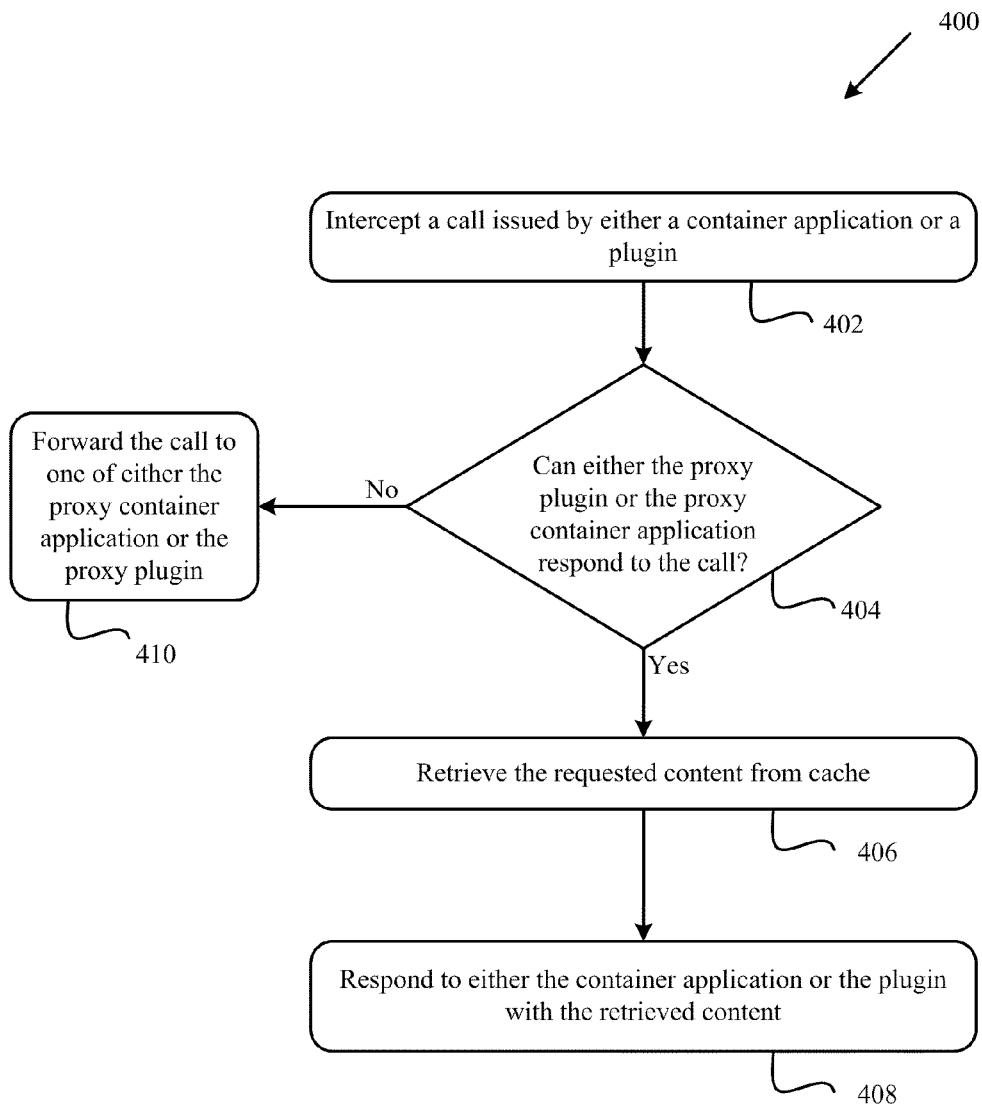
FIG. 4 illustrates a flow diagram depicting an embodiment of a process for responding to a call.

Illustrated in FIG. 4 is one embodiment of a method or process 400 for responding to call issued by either the container application 205 or the plugin 240. In one embodiment, the method 400 includes intercepting a call issued by either the container application 205 or the plugin 240 (Step 402). A determination is then made as to whether the proxy container application 235 or the proxy plugin 210 can respond to the intercepted call (Step 404). When neither the proxy container application 235 nor the proxy plugin 210 can respond to the call, then the call is forwarded to the appropriate proxy (Step 410). When either the proxy container application 235 or the proxy plugin 210 can respond to the call, then the requested content is retrieved from cache 225, 245 (Step 406) and the requested content is forwarded to either the container application 205 or the plugin 240 (Step 408).

Further referring to FIG. 4, and in more detail, in one embodiment a call issued by either the container application 205 or the plugin 240 is intercepted (Step 402). When the call is issued by the container application 205, the proxy plugin 210 intercepts the call. On the other hand, when the call is issued by the plugin 240, the proxy container application 235 intercepts the call. In some embodiments a separate application executing one either the local computing machine 105, the remote computing machine 102 or a third computing machine can intercept the call issued by either the container application 205 or the plugin 240. When a separate application intercepts the call, then the separate application can forward the call to either the proxy plugin 210 or the proxy container application 235.

Once the issued call is intercepted, then a determination is made as to whether the proxy plugin 210 or the proxy container application 235 can respond to the call (Step 404). This determination can be made by querying a table to determine whether a response to the issued call is stored in cache 225, 245. In instances where a response to the call issued by the plugin 240 is stored in cache 245 on the remote computing machine 102, a response can be returned to the proxy container application 235 indicating that the response resides in cache 245 and in some embodiments, also provides the location of the response in cache 245. Similarly, in instances where a response to the call issued by the container application 205 is stored in cache 225 on the local computing machine 106, a response can be returned to the proxy plugin 210 indicating that the response resides in cache 225 and in some embodiments, also provides the location of the response in cache 225. In one embodiment, the proxy plugin 210 can determine that a response to the call is present in cache 225 after searching through the cache 225 for the response. Similarly, in some embodiments the proxy container application 235 can determine that a response to the call is present in cache 245 after searching through the cache 245 for the response. In each of these embodiments, the proxy plugin 210 and the proxy container application 235 determine that they can respond to the call upon locating the response in cache 225, 245.

If a response is found or if a determination is made that the proxy plugin 210 or the proxy container application 235 cannot respond to the issued call, then the call is forwarded to the other of either the proxy container application 235 or the proxy plugin 210 (Step 410). If a determination is made that the proxy plugin 210 cannot respond to the call, then the call is forwarded to the client agent 230 which in some embodiments forwards the call to the proxy container application 235. When a determination is made that the proxy container application 235 cannot respond to the call, then the call in some embodiments, is forwarded to the proxy plugin 210.

If a determination is made that either the proxy plugin 210 or the proxy container application 235 can respond to the call, the requested content is retrieved from cache 225, 245 by either the proxy plugin 210 or the proxy container application 235 (Step 406). When a determination is made that the proxy plugin 210 can respond to the call issued by the container application 205, the proxy plugin 210 retrieves from cache 225 a response to the call issued by the container application 205. Similarly, when a determination is made that the proxy container application 235 can respond to the call issued by the plugin 240, the proxy container application 235 retrieves from cache 245 a response to the call issued by the plugin 240. In some embodiments the container application 205 or the plugin 240 issues a call, while in other embodiments they issue a request for information, or a request for access to an interface on the plugin 240 or the container application 205. In still other embodiments, the proxy plugin 210 and/or the proxy container application 235 can retrieve the requested content from cache 225, 245 by searching through cache for a particular memory location, or searching through cache 225, 245 for the expected content.

Once the requested content is retrieved from cache 225, 245 (Step 406), the requested content is forwarded to either the container application 205 or the plugin 240 (Step 408). Thus, if the proxy plugin 210 intercepts the call, determines that the proxy plugin 210 can respond to the call, and retrieves the requested content from cache 225; then the proxy plugin 210 can respond to the call issued by the container application 205 with the content retrieved from cache 225 (Step 408). Similarly, if the proxy container application 235 intercepts the call, determines that the proxy container application 235 can respond to the call, and retrieves the requested content from cache 245; then the proxy container application 235 can respond to the call issued by the plugin 240 with the content retrieved from cache 245 (Step 408).

In some embodiments the method 400 described in FIG. 4 can be referred to as short-circuiting the interface. This label refers to an attribute of the method 400 that allows a local proxy to respond to a call rather than transmitting the call to a remote computer able to respond to the call. Thus, rather than send a call issued by the container application 205 to the plugin 240 on the remote computing machine 102, the proxy plugin 210 can respond to the call by retrieving a response from cache 225 on the local computing machine 106. Similarly, the proxy container application 235 can respond to calls issued by the plugin 240 by retrieving a response from cache 245 on the remote computing machine 102. By implementing this process 400, the path of execution taken by an interface call is shortened thereby reducing the amount of traffic over the network 104 and therefore the virtual channel 255, and reducing the response time. Thus, the performance of both the container application 205 and the plugin 240 are increased because each time the response path is short-circuited, the resultant functionality is substantially similar to the functionality provided when the container application 205 and plugin 240 execute on the same computer.

In some embodiments, those responses stored in cache 225, 245 are the responses to frequently made calls. Thus, the proxy plugin 210, proxy container application 235, delivery system 220 or client agent 230 may choose to cache responses to calls that are made repeatedly over a particular period of time. Similarly, a decision may be made to drop certain calls when it is determined that the response to a subsequent call can undo the affect achieved by responding to the initial call. Such a determination can be made by reviewing the type of call or the type of interface requested by a call.

Figure 5:
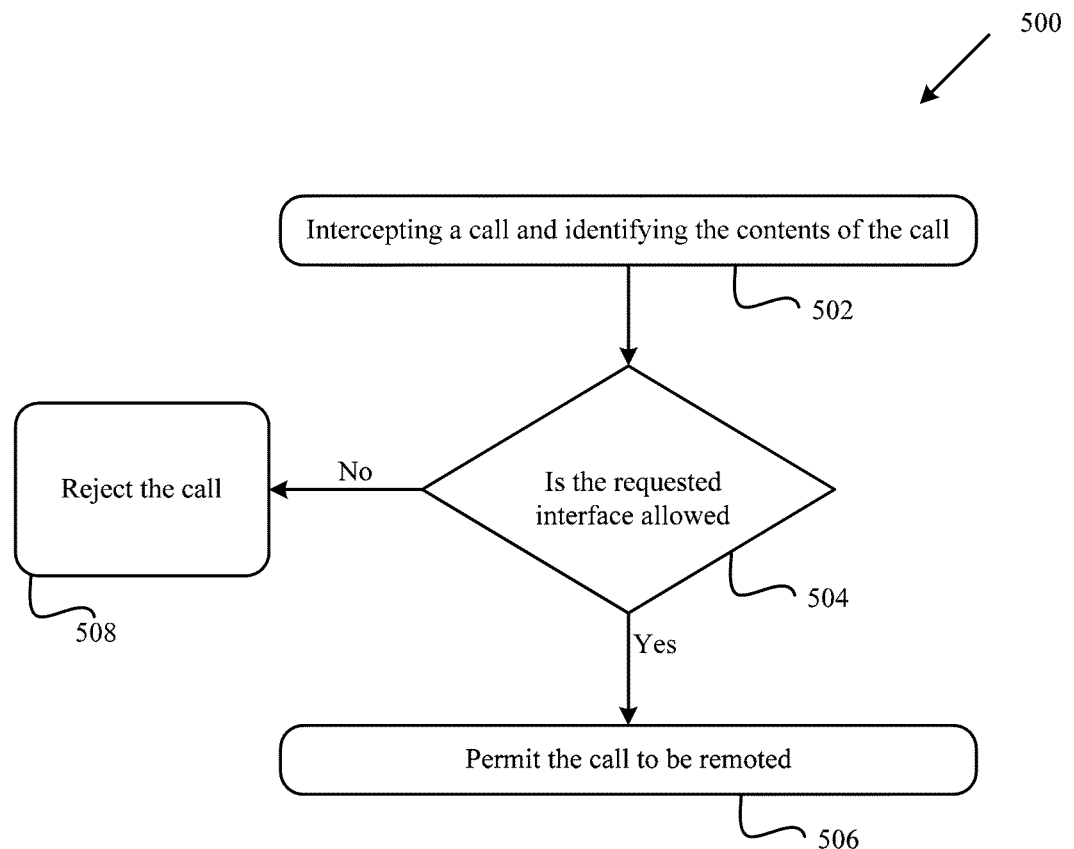
FIG. 5 illustrates a flow diagram depicting an embodiment of a process for permitting the remoting of a call to a plugin.

Illustrated in FIG. 5 is a method 500 for permitting the response to a call. A proxy plugin 210 or proxy container application 235 can intercept a call issued by a container application 205 or a plugin 240 and further determine the contents of the call (Step 502). If the interface requested by the proxy is allowed (Step 504), then the call is permitted (Step 506). If the requested interface is not allowed (Step 504), then the call is rejected (Step 508).

Further referring to FIG. 5, and in more detail, in one embodiment the proxy plugin 210 intercepts calls generated and issued by the container application 205 (Step 502). Similarly, the proxy container application 235 can intercept calls generated and issued by the plugin 240 (Step 502). Once either the proxy plugin 210 or the proxy container application 235 intercepts a call, then the proxy can review the call and determine the type of interface or content requested. In some embodiments, the type of requested interface can include determining a functionality associated with the requested interface. For example, the interface request may include requesting that a FLASH player execute a particular movie file or display a particular type of graphic. An initial review of the call can, in some embodiments, illuminate the type of functionality requested by the call. In other embodiments, a review of the call can include determining the contents of the call such as metadata included within the call.

Once the proxy identifies the contents of the call or the functionality requested by the call, the proxy 210, 240 can determine whether the requested interface is allowed (Step 504). Determining the permission level associated with a particular container application 205, plugin 240, computing machine or user can include reviewing a list or table of approved content or functionality. This table or list can identify content or functionality permitted for a particular user, computer, IP address, application, plugin, domain, or any other identifier used to identify a particular machine, user or application. If the requested functionality or content is permitted or allowed, per the permission table or list, then the call is permitted (Step 506), if the call is not allowed then the call is rejected (Step 508).

In one embodiment, the system includes a security agent (Not Shown) either within the proxy plugin 210 or proxy container 235, or an agent executing either on the local computing machine 106, the remote computing machine 102 or on a third computing machine executing on the network 104 and in communication with the local computing machine 106 and/or the remote computing machine 102. The security agent can, in some embodiments, intercept all calls issued by the container application 205 and/or the plugin 240 to determine whether the call is permitted or allowed. In some embodiments the security agent communicates with a permissions table or list stored in memory on either the local computing machine 106, the remote computing machine 102, or a third computing machine. When the security agent determines that the call is not permitted, the security agent can reject the call (Step 508) by not allowing it to be forwarded and by responding to the call with an error message indicating that the requested functionality or content is not allowed. In other embodiments, the security agent can respond to allowed functionality and content by forwarding the call along to either the proxy plugin 210 or the proxy container application 235.

In some embodiments, further security precautions are taken by permitting the proxy plugin 210 to execute at the same integrity or security level as the plugin 240. Similarly, the proxy container application 235 can execute at the same integrity or security level as the container application 205.

Figure 6:
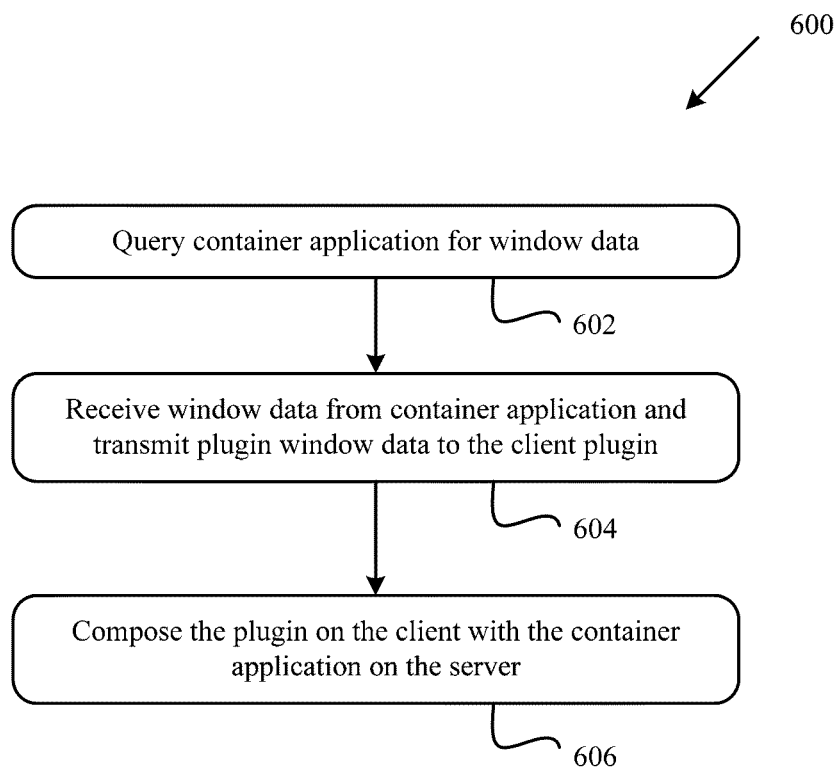
FIG. 6 illustrates a flow diagram depicting an embodiment of a process for obtaining and remotely providing plugin window data.

Illustrated in FIG. 6 is a method 600 for obtaining window data specific to a plugin window. The proxy plugin 210 can query either a container application 205 or an operating system executing on the local computing machine 106 for window data associated with the plugin 240 (Step 602). Upon receiving the window data from either the container application 205 or the operating system, the proxy plugin 210 transmits the plugin window data to the plugin 240 executing on the client, i.e. the remote computing machine 102 (Step 604). The plugin 240 then uses the window data to compose itself with the container application 205 (Step 606).

Further referring to FIG. 6, and in more detail, in one embodiment the proxy plugin 210 queries or requests from the container application 205 window data associated with the plugin 240 (Step 602). In some embodiments, the window data includes information about where within the container application 205 the plugin's graphical or multimedia content is displayed. When the container application 205 executes on the same machine as the plugin 240, the container application 205 and the plugin 240 are composed together such that the resulting graphic appears to be coming from the same source. For example, a web page that displays a FLASH player which plays a video can appear to the user as though the web page itself displays the video. In reality, the web page may simply draw a region within the web page for the graphical output of the FLASH player. The multimedia content generated by the FLASH player is displayed within the display region drawn or set-aside by the web page. Information associated with the graphical output region within the container application 205 can include the size of the graphical output region, the placement of the graphical output region, the clipping region of the graphical output region, and any other information that can be used to characterize the graphical output region within the container application 205.

In some embodiments the proxy plugin 210 queries the container application 205 for information while in other embodiments the proxy plugin 210 queries the operating system executing on the local computing machine 106. When the proxy plugin 210 receives window data from the operating system, the proxy plugin 210 may in some embodiments, utilize additional protocol commands to transmit the window data to the plugin 240 on the client or remote computing machine 102. One example of an application program interface call to the operating system on the local computing machine 106 includes issuing a GetWindowPosition( ) call which in most embodiments can result in receiving the plugin window's position on the screen. This application program interface call is issued to the operating system and not the container application 205.

In response to the proxy plugin 210 queries, the proxy plugin 210 can receive the window data from either the container application 205 or the operating system, and can transmit the received window data to the plugin 240 (Step 604). In some embodiments, the proxy plugin 210 stores the window data in cache 225 prior to transmitting the window data to the plugin 240. In other embodiments, the plugin 240 stores the window data in cache 245 upon receiving the window data. The proxy plugin 210 can, in some embodiments, transmit the window data across the virtual channel 255 using a presentation level protocol. In some embodiments, the proxy plugin 210 forwards the window data to the application/desktop delivery system 220 which then transmits the window data to the client agent 230. Upon receiving the window data the client agent 230 can, in some embodiments, store the window data in cache 245. In other embodiments, the client agent 230 can forward the window data to the proxy container application 235 which can then forward the window data to the plugin 240. Still other embodiments include a client agent 230 that forwards the window data directly to the plugin 240.

In one embodiment, once the plugin 240 receives the window data, the plugin 240 can compose itself with the container application 205 executing on the local computing machine 106 (Step 606). In other embodiments, the plugin 240 can compose itself with the proxy container application 235. Composing a plugin to a container application 205 can include configuring the plugin so that the graphical content is formatted to be displayed within an output region defined within the container application 205. The formatting can include altering the graphical content's resolution so that it may be displayed within the output region and so that it may not be clipped when it is displayed in the output region.

Figure 7:
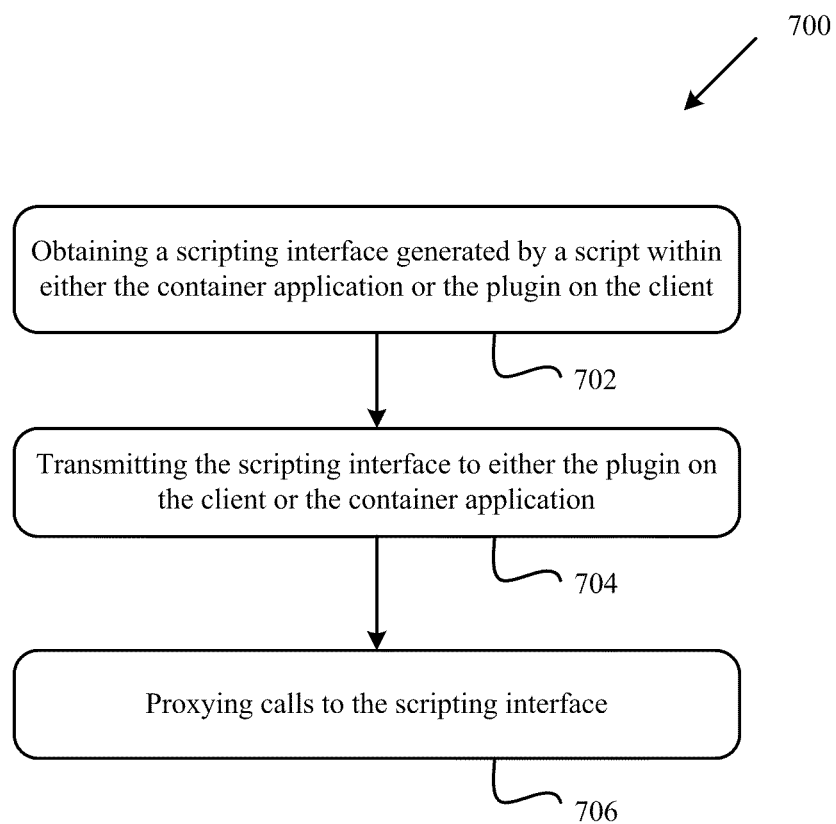
FIG. 7 illustrates a flow diagram depicting an embodiment of a process for remotely providing scripting interfaces.

Illustrated in FIG. 7 is an embodiment of a process 700 for obtaining a scripting interface. Either the proxy plugin 210 or the proxy container application 235 obtains a scripting interface generated by a script executing within the container application 205 or the plugin 240 (Step 702). Once the scripting interface is obtained, the scripting interface is transmitted to either the plugin 240 or the container application 205 (Step 704). Once the scripting interface is installed, the proxy plugin 210 and/or the proxy container application 235 can intercept calls to a scripting interface and further proxy the calls (Step 706).

Further referring to FIG. 7, and in more detail, in one embodiment the proxy plugin 210 obtains a scripting interface from the container application 205 (Step 702). Upon obtaining the scripting interface, the proxy plugin 210 transmits the scripting interface to the proxy container application 235 (Step 704) which receives the scripting interface and installs it within its architecture. By installing the scripting interface into the proxy container application's 235 interface, the proxy container application 235 can provide the plugin 240 with the ability to request access to the installed scripting interface. Installing the scripting interface can include altering the architecture of the proxy container application 235 binary so that the binary offers the plugin 240 the ability to call upon a particular scripting interface. Once the scripting interface is installed within the proxy container application 235 architecture, the proxy container application 235 can intercept calls to the scripting interface, and transmit the calls to the scripting interface on the container application 205 (Step 706).

Similarly, the proxy container application 235 can obtain a scripting interface from the plugin 240 (Step 702). Upon obtaining the scripting interface, the proxy container application 235 transmits the scripting interface to the proxy plugin 210 (Step 704) which receives the scripting interface and installs it within its architecture. By installing the scripting interface into the proxy plugin's 210 interface, the proxy plugin 210 can provide the container application 205 with the ability to request access to the installed scripting interface. Installing the scripting interface can include altering the architecture of the proxy plugin 210 binary so that the binary offers the container application 205 the ability to call upon a particular scripting interface. Once the scripting interface is installed within the proxy plugin 210 architecture, the proxy plugin 210 can intercept calls to the scripting interface, and transmit the calls to the scripting interface on the plugin 240 (Step 706).

In one embodiment, a scripting interface is generated by a script executing within either the container application 205 or the plugin 240. For example, Javascript code in a HTML page can call methods and properties on an ACTIVEX control hosted in the same HTML page by requesting access to the interfaces associated with the ACTIVEX control. This example illustrates a script executing within a container application 205 to issue a call from a scripting interface within the container application 205 to an interface on a plugin 240. Thus, while the above examples illustrate proxying calls to a scripting interface, in other embodiments calls issued by a scripting interface can be intercepted and transmitted to either the container application 205 or the plugin 240. Thus calls issued by a scripting interface can be proxied to a container application 205 or plugin 240.

Figure 8:
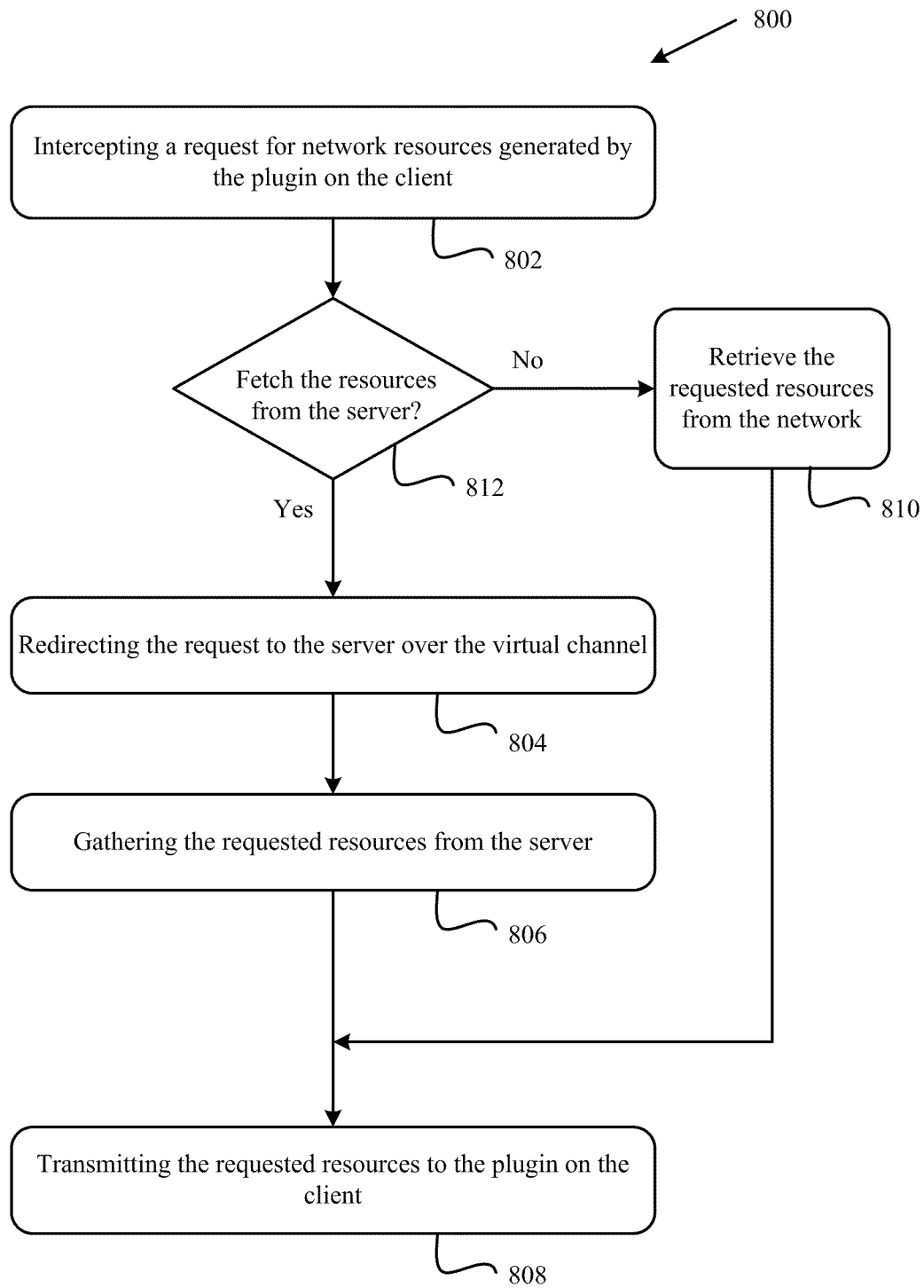
FIG. 8 illustrates a flow diagram depicting an embodiment of a process for obtaining network resources.

Illustrated in FIG. 8 is one embodiment of a method 800 for dynamically fetching network content. In one embodiment a request for network resources generated and issued by the plugin 240 is intercepted (Step 802). Once the request has been intercepted, a determination is made as to whether the resources should be fetched from the server 106 (Step 812). When a determination is made that the requested network resources should not be fetched from the server 106, then the network resources are retrieved or fetched from the network 104 (Step 810). When a determination is made that the requested network resources should be retrieved or fetched from the server 106, then the request is redirected to the server or local computing machine 106 over the virtual channel 255 (Step 804). Once the request is redirected to the local computing machine 106, the requested resources are gathered from the local computing machine 106 (Step 806) and the gathered resources are transmitted to the plugin 240 (Step 808).

Further referring to FIG. 8, and in more detail, in one embodiment the plugin 240 may require access to resources specific to the network on which the local computing machine 106 is located. In those embodiments, as well as in those embodiments where the plugin 240 requires downloading resources indirectly through the virtual channel 255, the plugin 240 can generate and issue a request for network resources (Step 802). In one embodiment this request can be intercepted by the proxy container application 235, while in other embodiments this request can be intercepted by the client agent 230. Still other embodiments can include another client, agent or module executing on the remote computing machine 102 either independently or as a process or subroutine within either the client agent 230 or proxy container application 235, to intercept network resource requests issued by the plugin 240. When this additional client, agent or module intercepts the resources request, the client, agent or module can determine whether to retrieve the resources directly from the network or through a call to the local computing machine 106. Intercepting the request for resources can include hooking an application interface call to the operating system on the remote computing machine 102. Hooking the application interface call can result in intercepting any requests made to access the network 104. In embodiments where it is determined that the resources should be retrieved from the local computing machine 106 via the virtual channel 255, the request is redirected to the local computing machine 106 over the virtual channel 255 (Step 804).

Once a request for network resources is intercepted, a determination is made as to whether the requested resources should be retrieved from the server 106 (Step 812). This determination can in many embodiments be dynamic such that the module carrying out the method 800 can determine whether to retrieve the requested resources from the server 106 by first trying to retrieve the network resources from the client 102. In such an embodiment, the module can try and access the desired network 104 in order to download or stream the requested network resources. Should the module fail to access the network and/or download or stream the requested content, then the module can determine (Step 812) that the network resources should be downloaded or streamed from the server 106. In other embodiments, the module may determine that the network resources should be downloaded from the server 106 based in part on a review of type of requested resources. The module can, in some embodiments, have access to a database or table (Not Shown) on the client 102, where the database or table can list whether a particular network resource should be downloaded via the server 106 or directly from the network 104. For example, in some embodiments the list may indicate that any resources to-be-streamed should be streamed directly from the network 104. In this embodiment, the module can determine (Step 812) that the resources should not be fetched from the server 106 and the module retrieves or streams the network resources directly from the network 104 (Step 810). In still other embodiments, a configuration file accessible by the module can be used to determine whether a particular request or a particular set of resources should be retrieved from the server 106. Upon reviewing this configuration file, the module can make a determination as to whether the network resources should be downloaded from the server 106 or directly from the network 104 to the client 102. In still other embodiments, the determination as to whether network resources should be retrieved from the server 106 can be made by reviewing any of the following: the type of plugin 240 requesting the network resources; the type of requested resources; the user requesting the resources; the client 102 from which the user requests the resources; the amount of bandwidth available on the network; a transmit time associated with the amount of time required to transmit a request over the virtual channel 255 and receive a response; the number of user sessions executing on the server 106; whether the requested network resources are on a private network; whether the user and/or the client 102 have access to the network on which the network resources reside; and any other factor or parameter that can be used to dynamically determine whether to access network resources via the virtual channel 255 and server 106, or directly via the network 104. The determination (Step 812) can, in some embodiments, be based in part on a review of any of the previously mentioned factors or parameters.

When a determination is made not to access the resources via the server 106, the network resources are then retrieved directly from the network 104 via the client 102 (Step 810). The client 102 can, in this embodiment, retrieve the network resources directly from the network 104, download or stream the network resources to the client 102 and forward the requested resources to the plugin 240. In embodiments where the plugin 240 can retrieve the network resources directly from the network 104, the plugin 240 issues the request and the client agent 230 or another module such as the modules, clients, agents, sub-routines and processes described herein, can access the network and download or stream the requested resources to the plugin 240. In some embodiments the requested resources include a FLASH movie, in another embodiment the requested resources include FLASH video streams.

When a determination is made to access the resources via the server 106, the request is redirected to the local computing machine 106 (Step 804), the request can be received by any of the following: the proxy plugin 210; the application/desktop delivery system 220; a process or sub-routine executing within either the proxy plugin 210 or the application/desktop delivery system 220; a client, agent or module executing independently on either the local computing machine 106 or a third computing machine remotely located from but in communication with the local computing machine 106; or any other agent able to receive the request. Upon receiving the request, the network resources are retrieved from cache 225, a storage repository on the network 104, a third computing machine on the network 104, a storage repository on the local computing machine 106, or any other location able to store the requested resources. While in some embodiments the network resources are retrieved, in others they are gathered or obtained (Step 806).

Once the network resources are gathered (Step 806), they are then transmitted to the plugin 240. In some embodiments the client agent 230 receives the network resources and passes them along to the plugin 240.

Section C: Synchronizing Client-Side and Server-Side Cookies

Figure 9:
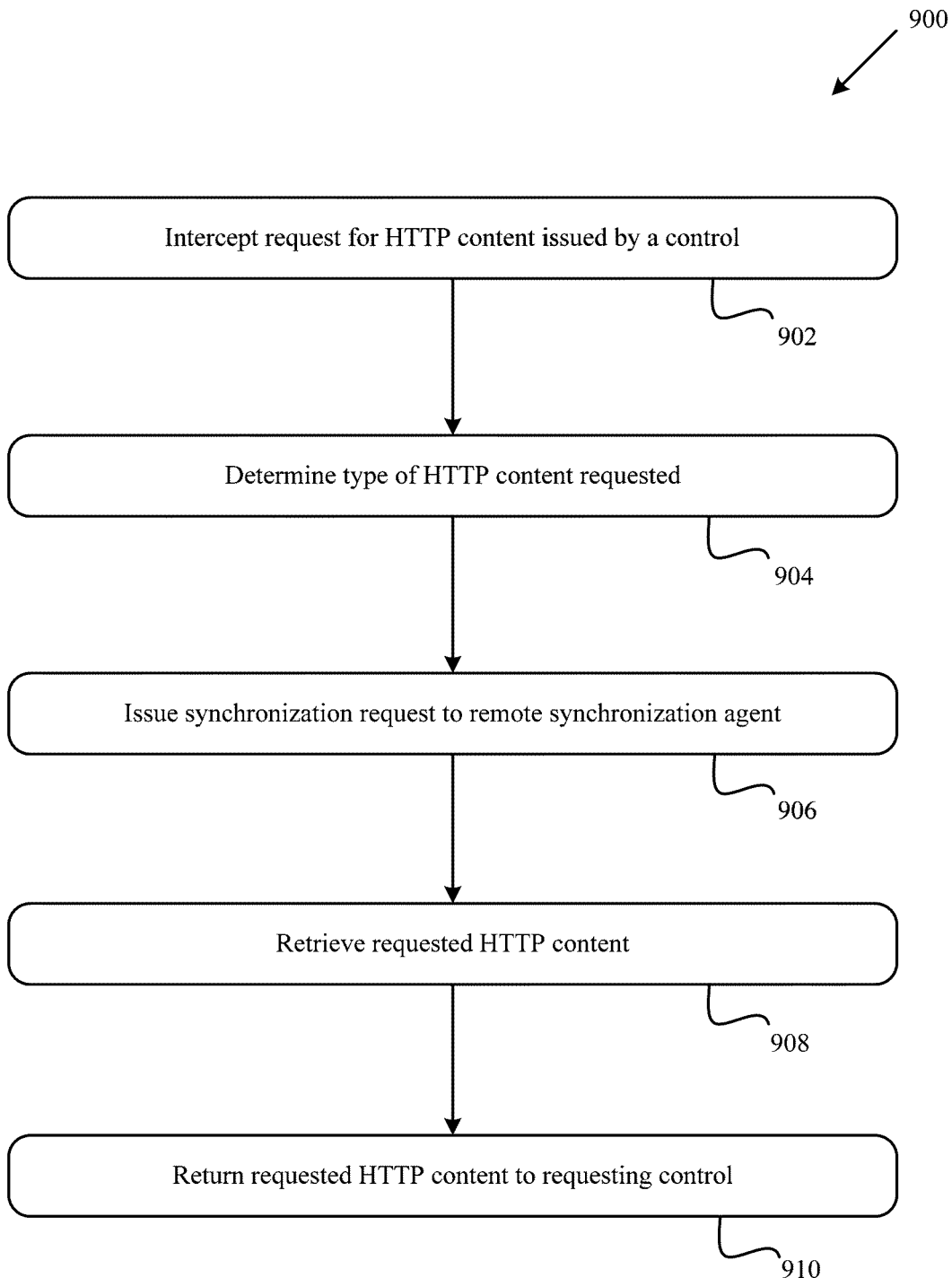
FIG. 9 illustrates a flow diagram depicting an embodiment of a process for synchronizing cached data.

Illustrated in FIG. 9 is an embodiment of a method 900 for synchronizing client-side cookies with server-side cookies. In one embodiment, a synchronization agent 227 executing on a client 102 intercepts a request for HTTP content issued by a control executing on the client 102 (Step 902). The synchronization agent 227 determines the type of HTTP content requested by the control (Step 904) and issues a synchronization request to a remote synchronization agent 223 executing on a server 106 (Step 906). The synchronization agent 227 then retrieves the requested HTTP content from data retrieved by the server synchronization agent 223 (Step 908) and returns the requested HTTP content to the control that initially requested the HTTP content (Step 910).

Further referring to FIG. 9, and in more detail, in one embodiment the client synchronization agent 227 intercepts HTTP content requests issued by a control executing on the client 102 (Step 902). A HTTP content request can include a request for cookies or other HTTP content. The request can include an indication of the type of content requested, an identifier of the control requesting the content or other information that can be used to determine what type of content was requested and where to forward the content once retrieved from storage. In some embodiments, the client synchronization agent 227 does not intercept the HTTP content request, but rather receives a notice or other indication that a HTTP content request was issued. When an HTTP content request is issued by a control, plugin or script, and the HTTP content cannot be found, the control/plugin/script can issue a request to the synchronization agent 227 for the HTTP content. In other embodiments, when HTTP content cannot be found locally or on a particular network, an error message can be posted to the system such that a synchronization agent 227 can responsively retrieve the requested content from a remote computer.

The HTTP content request, in some embodiments, can be issued by a control, an ActiveX control, a plugin, a script, or other sub-routine or sub-application/sub-program. In some embodiments, the control can be a Flash ActiveX control that tries to fetch HTTP content using the HTTP protocol. The Flash HTTP content request, in some embodiments, can be URL specific such that each time the Flash player executes within a page of a particular URL, the Flash player requests HTTP content specific to that page and/or that URL. In many instances, the Flash player can retrieve the HTTP content from a local cache, however in instances where the Flash play executes within a remotely provided browser, the HTTP content cannot be found in local memory. In these instances, the HTTP content can be retrieved from the server or from the remote computing machine executing the remotely provided browser.

In some embodiments, the HTTP content request can be a request for cookies, or other cached data. These cookies can contain user-specific data, authentication data, URL-specific data, or other data that can be used by the control, script or plugin to execute and generate content. For example, the Flash player can use URL specific cookies to generate Flash content which can then be displayed within the page displayed within the remotely provided browser.

The synchronization agent 227 can analyze the HTTP content request to determine the type of HTTP content requested by the control (Step 904). The type of content requested can, in some embodiments, impact the amount or type of information the synchronization agent 227 requests from the server-side synchronization agent 223. In some embodiments, the synchronization agent 227 can analyze the request to determine any of the following information: the URL identified in the request; the name of the cookie; the user associated with the cookie; the application associated with the cookie; the domain name associated with the cookie; the size of the requested content; additional content associated with the requested content; the name of the control or script; the version of the control or script; an identifier associated with the user session; or any other information that can be used by the synchronization agents 227, 223 to identify the cookie in a remote memory storage.

In some embodiments, the synchronization agent 227 can issue a request to a remote synchronization agent 223 to synchronize (Step 906). While FIG. 9 illustrates a method 900 where the synchronization agent 227 issues a synchronization request, in some embodiments the synchronization agent 227 can send a request to the server synchronization agent 223 for the HTTP content identified by the control. In this embodiment, the server synchronization agent 223 retrieves content-identifying information from the request issued by the client synchronization agent 227, and uses the content-identifying information to retrieve the HTTP content from memory on the server. The server synchronization agent 223 can then transmit the retrieved HTTP content to the client synchronization agent 227. In still other embodiments, the synchronization request can include the content request generated by the control. The synchronization request, in some embodiments, can be issued or transmitted to the remote synchronization agent 223 in response to determining the type of content requested or in response to receiving the control input generated by the remote control 215. In other embodiments, the server synchronization agent 223 can retrieve each cookie stored on the server 106 and transmit the cookies to the client synchronization agent 227. In yet other embodiments, the server synchronization agent 223 can retrieve a subset of the cookies stored on the server 106 and transmit the cookies to the client synchronization agent 227. The subset of cookies can be determined based on any one of the following characteristics: a user session identifier; the type of control, plugin or script; the URL; a client identifier; the page displayed within the browser; or any other characteristic.

In some embodiments, the client synchronization agent 227 can forward the HTTP content request to the server synchronization agent 223 rather than send the server synchronization agent 223 a synchronization request. The server synchronization agent 223, in some embodiments, can respond to a synchronization request by retrieving from the client a listing or table of cookies or other HTTP data stored on the client 102. Upon retrieving the list, the server synchronization agent 223 can then compare the client 102 cookie list to a listing of cookies stored on the server 106 to identify one or more cookies that are stored on the server 106 and not on the client 102. The server synchronization agent 223 can then send the client 102 each cookie stored on the server 106 that is not stored on the client 102. In some embodiments, the server synchronization agent 223 can further reduce the cookie list using any of the above-mentioned characteristics.

When the client synchronization agent 227 receives a plurality of cookies, the client synchronization agent 227 can retrieve the requested HTTP content from the plurality of cookies (Step 908). In other embodiments, the client synchronization agent 227 can retrieve the requested HTTP content from a temporary memory storage on the server 106. In still other embodiments, the client synchronization agent 227 can retrieve the requested HTTP content directly from a memory location on the server 106 assigned to store that particular cookie. The server synchronization agent 223, in some embodiments, can return to the client synchronization agent 227 the memory location of the requested cookie. The client synchronization agent 227 can then use the memory location information to retrieve the requested HTTP content (Step 908). Retrieving the cookie from the server 106, in some embodiments, can include using the WinlNet InternetGetCookie function.

In some embodiments, the remote synchronization agent 223 can retrieve the requested HTTP content in response to receiving the synchronization request from the synchronization agent 227 executing on the client computer 102. In these embodiments, the remote synchronization agent 223 can retrieve the requested content from a storage repository such as any memory location on the server 106. In some embodiments, the remote synchronization agent 227 can retrieve the requested content from a remote storage location or a storage location on a remote computer. Upon retrieving the requested content, the remote synchronization agent 223 can transmit the retrieved content to the client computer 102.

When the client synchronization agent 227 receives the requested HTTP content, the client synchronization agent 227 can return the content to the requesting control, plugin or script (Step 910). In some embodiments, the client synchronization agent 227 can set the cookie(s) on the client 102 so that the control can continue executing. Setting the cookie on the client 102 can, in some embodiments, include calling the InternetSetCookie function. The client synchronization agent 227, in one embodiment, can store the retrieved content to a memory location on the client 102.

While FIG. 9 illustrates a method for synchronizing client-side and server-side HTTP content, in some embodiments the method 900 can include steps for synchronizing cookies between two clients, two servers, an appliance and a computer, and a mobile device and a computer or appliance. In some embodiments, the method 900 can be carried out by synchronization agents, while in other embodiments the method 900 can be carried out by a function within an application/desktop delivery application or client. In some embodiments, the method 900 can further include storing the HTTP content locally on the client computer 102 upon receiving the content from the remote synchronization agent 227. The content can be stored in any storage repository or memory location on the client computer 102.

While certain exemplary embodiments have been described and shown in the accompanying drawings, it is to be understood that such embodiments are merely illustrative of and not restrictive on the broader disclosure, and that the methods and systems described herein not be limited to the specific constructions and arrangements shown and described. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:

1. A method for synchronizing server-side cookies with client-side cookies, the method comprising:
receiving, by a plugin executing on a client computer, a control input generated by a remote plugin executing on a server;
determining, by the plugin executing on the client computer, a permission level associated with the remote plugin, wherein the permission level is identified in a permission table;
generating, by the plugin executing on the client computer, responsive to receiving the control input and according to the permission level associated with the remote plugin, a request for HTTP content;
intercepting, by a synchronization agent executing on the client computer, the request for HTTP content;
determining, by the synchronization agent executing on the client computer, a type of HTTP content requested by the plugin executing on the client computer;
issuing, by the synchronization agent executing on the client computer responsive to determining the type of HTTP content, a synchronization request to a remote synchronization agent executing on the server;

retrieving, by the remote synchronization agent executing on the server responsive to the synchronization request, from the client computer, a listing of HTTP content stored on the client computer;

performing, by the remote synchronization agent executing on the server, a comparison of the listing of HTTP content stored on the client computer to a listing of HTTP content stored on the server;

receiving, by the synchronization agent executing on the client computer, based on a result of the comparison, the requested HTTP content from the remote synchronization agent executing on the server; and returning, by the synchronization agent executing on the client computer, the received HTTP content to the plugin executing on the client computer.

2. The method of claim 1, wherein issuing the synchronization request further comprises forwarding the HTTP content request generated by the plugin executing on the client computer to the remote synchronization agent executing on the server.

3. The method of claim 1, wherein receiving the control input further comprises receiving control input from the remote plugin corresponding to the plugin executing on the client computer.

4. The method of claim 1, wherein the plugin executing on the client computer comprises a FLASH plugin.

5. The method of claim 1, further comprising retrieving, by the remote synchronization agent responsive to receiving the synchronization request from the synchronization agent executing on the client computer, the requested HTTP content.

6. The method of claim 5, wherein retrieving the requested HTTP content further comprises retrieving the requested HTTP content from a storage repository on the server.

7. The method of claim 5, further comprising transmitting, by the remote synchronization agent, the retrieved HTTP content to the client computer.

8. The method of claim 1, wherein receiving a request for HTTP content further comprises receiving a request for cached data.

9. The method of claim 1, wherein receiving a request for HTTP content further comprises receiving a request for cookies.

10. The method of claim 1, further comprising storing the received HTTP content in a storage repository on the client computer.

11. A system for synchronizing server-side cookies with client-side cookies, the system comprising:

a client computer communicating with a server over a virtual channel;

a remote application executing on the server to generate application output, the application output remotely displayed on the client computer;

a remote plugin executing on the server within the remote application;

a plugin executing on the client computer within a context of the remote application to:

receive control input generated by the remote plugin, and determine a permission level associated with the remote plugin, wherein the permission level is identified in a permission table;

generate, responsive to receiving the control input and according to the permission level associated with the remote plugin, a request for HTTP content; and a synchronization agent executing on the client computer to:

intercept the HTTP content request from the plugin executing on the client computer, determine, based on the HTTP content request, a type of HTTP content requested by the plugin executing on the client computer, issue, based on the type of HTTP content, a synchronization request to a remote synchronization agent executing on the server, receive, based on a result of a comparison of a listing of HTTP content stored on the client computer to a listing of HTTP content stored on the server, the requested HTTP content from the remote synchronization agent, and return the received HTTP content to the plugin executing on the client computer; and the remote synchronization agent executing on the server to:

retrieve, based on the synchronization request, from the client computer, the listing of HTTP content stored on the client computer;

perform the comparison of the listing of HTTP content stored on the client computer to the listing of HTTP content stored on the server.

12. The system of claim 11, wherein the synchronization request further comprises the HTTP content request generated by the plugin executing on the client computer.

13. The system of claim 11, wherein the remote plugin executing on the server corresponds to the plugin executing on the client computer.

14. The system of claim 11, wherein the plugin executing on the client computer comprises a FLASH plugin.

15. The system of claim 11, wherein the remote synchronization agent retrieves the requested HTTP content responsive to receiving the synchronization request from the synchronization agent executing on the client computer.

16. The system of claim 15, wherein the remote synchronization agent retrieves the requested HTTP content from a storage repository on the server.

17. The system of claim 15, wherein the remote synchronization agent transmits the retrieved HTTP content to the client computer.

18. The system of claim 11, wherein the HTTP content comprises cached data.

19. The system of claim 11, wherein the HTTP content comprises cookies.

20. The system of claim 11, wherein the synchronization agent stores the received HTTP content in a storage repository on the client computer upon receiving the HTTP content from the remote synchronization agent.

* * * * *